United States Patent
Schwabe

(10) Patent No.: US 6,883,163 B1
(45) Date of Patent: Apr. 19, 2005

(54) POPULATING RESOURCE-CONSTRAINED DEVICES WITH CONTENT VERIFIED USING API DEFINITIONS

(75) Inventor: Judith E. Schwabe, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 483 days.

(21) Appl. No.: 09/661,581

(22) Filed: Sep. 14, 2000

Related U.S. Application Data

(60) Provisional application No. 60/200,480, filed on Apr. 28, 2000.

(51) Int. Cl.$^7$ .............................................. G06F 9/44
(52) U.S. Cl. ..................... 717/126; 717/124; 717/175; 714/100; 714/38; 713/155
(58) Field of Search ............................... 717/124–128, 717/175, 165, 130, 108, 174; 714/100, 38, 48, 52; 713/155, 201; 710/8; 702/103; 707/1, 10, 104.1; 709/217, 221

(56) References Cited

U.S. PATENT DOCUMENTS

| | | | |
|---|---|---|---|
| 5,022,028 A | * 6/1991 | Edmonds et al. .............. 714/38 |
| 5,408,665 A | 4/1995 | Fitzgerals | |
| 5,446,901 A | 8/1995 | Owicki et al. ............... 395/700 |
| 5,490,249 A | * 2/1996 | Miller .......................... 714/38 |
| 5,613,101 A | 3/1997 | Lillich | |
| 5,615,137 A | 3/1997 | Holzmann et al. .......... 364/578 |

(Continued)

FOREIGN PATENT DOCUMENTS

| | | | |
|---|---|---|---|
| EP | 0 292 248 | 5/1988 | |
| EP | 0 498 130 A2 | 12/1991 | |
| EP | 0 685 792 A1 | 5/1995 | ........... G06F/11/00 |
| EP | 0 718 761 | 12/1995 | ........... G06F/9/455 |
| EP | 0 778 520 | 11/1996 | |
| EP | 0 778 520 A2 | 11/1996 | |
| WO | 98/37526 | 2/1998 | ............. G07F/7/10 |
| WO | WO 98/19237 | 5/1998 | ............. G06F/9/46 |
| WO | WO 98/521258 | 5/1998 | |
| WO | WO 98 43212 | * 10/1998 | |
| WO | WO 00/00890 | 1/2000 | ........... G06F/11/00 |
| WO | WO 00/25278 | 5/2000 | |
| WO | WO 00/46666 | 8/2000 | |
| WO | WO 01/14958 | 3/2001 | ............. G06F/9/00 |

OTHER PUBLICATIONS

Title: JRes: A Resource Accounting Interface for Java, author: Grzegorz Czjkowski et al, ACM, 1998.*

Title: Automated Modular Specification and Verification of Real–Time Reactive Systems, author: Ostroff et al, IEEE, 1995.*

Title: Verifying Programs with Unreliable Channels, author: Abdulla et al, IEEE, 1993.*

(Continued)

*Primary Examiner*—Chameli Das
(74) *Attorney, Agent, or Firm*—Gunnison, McKay & Hodgson, L.L.P.

(57) ABSTRACT

Remote incremental program verification may be achieved by receiving content verified by at least one content provider, installing the content on a resource-constrained device, disabling subsequent installation of content on the resource-constrained device, and issuing the resource-constrained device to an end user. The at least one content provider includes an applet provider, a device manufacturer, and a device issuer. The content includes at least one program unit, where each program unit comprises an Application Programming Interface (API) definition file and an implementation. Each API definition file defines items in its associated program unit that are made accessible to one or more other program units, and each implementation includes executable code corresponding to the API definition file. The executable code includes type specific instructions and data.

74 Claims, 32 Drawing Sheets

U.S. PATENT DOCUMENTS

| | | | | |
|---|---|---|---|---|
| 5,652,835 A | * | 7/1997 | Miller | 714/38 |
| 5,668,999 A | | 9/1997 | Gosling | 395/704 |
| 5,724,272 A | * | 3/1998 | Mitchell et al. | 702/123 |
| 5,748,964 A | | 5/1998 | Gosling | 395/705 |
| 5,748,980 A | * | 5/1998 | Lipe et al. | 710/8 |
| 5,761,510 A | * | 6/1998 | Smith et al. | 717/124 |
| 5,884,316 A | | 3/1999 | Bernstein et al. | 707/103 |
| 5,925,140 A | * | 7/1999 | Hudson | 714/52 |
| 5,966,702 A | * | 10/1999 | Fresko et al. | 707/1 |
| 5,974,255 A | | 10/1999 | Gossain et al. | |
| 5,999,731 A | | 12/1999 | Yellin et al. | 395/704 |
| 6,002,871 A | | 12/1999 | Duggan et al. | |
| 6,005,942 A | * | 12/1999 | Chan et al. | 713/187 |
| 6,011,918 A | | 1/2000 | Cohen et al. | |
| 6,038,378 A | | 3/2000 | Kita et al. | |
| 6,052,732 A | | 4/2000 | Gosling | |
| 6,058,393 A | * | 5/2000 | Meier et al. | 707/10 |
| 6,067,639 A | * | 5/2000 | Rodrigues et al. | 714/38 |
| 6,075,940 A | | 6/2000 | Gosling | |
| 6,092,147 A | | 7/2000 | Levy et al. | 711/6 |
| 6,125,442 A | | 9/2000 | Maves et al. | |
| 6,138,112 A | | 10/2000 | Slutz | |
| 6,178,504 B1 | * | 1/2001 | Fieres et al. | 713/164 |
| 6,182,158 B1 | | 1/2001 | Kougiouris et al. | 709/328 |
| 6,202,070 B1 | * | 3/2001 | Nguyen et al. | 707/104.1 |
| 6,205,579 B1 | * | 3/2001 | Southgate | 717/173 |
| 6,212,633 B1 | | 4/2001 | Levy et al. | 713/153 |
| 6,230,312 B1 | * | 5/2001 | Hunt | 717/108 |
| 6,230,314 B1 | | 5/2001 | Sweeney et al. | |
| 6,230,318 B1 | | 5/2001 | Halstead et al. | |
| 6,243,859 B1 | | 6/2001 | Chen-Kuang | |
| 6,247,171 B1 | | 6/2001 | Yellin et al. | |
| 6,262,492 B1 | | 7/2001 | Sheng | |
| 6,272,674 B1 | * | 8/2001 | Holiday, Jr. | 717/174 |
| 6,347,398 B1 | * | 2/2002 | Parthasarathy et al. | 717/178 |
| 6,349,344 B1 | | 2/2002 | Sauntry et al. | |
| 6,360,334 B1 | * | 3/2002 | Kavanagh et al. | 714/38 |
| 6,363,488 B1 | * | 3/2002 | Ginter et al. | 713/201 |
| 6,370,686 B1 | * | 4/2002 | Delo et al. | 717/174 |
| RE37,722 E | | 5/2002 | Burnard et al. | |
| 6,389,467 B1 | * | 5/2002 | Eyal | 709/223 |
| 6,405,309 B1 | * | 6/2002 | Cheng et al. | 713/1 |
| 6,418,554 B1 | * | 7/2002 | Delo et al. | 717/174 |
| 6,466,947 B1 | * | 10/2002 | Arnold et al. | 707/104.1 |
| 6,477,666 B1 | | 11/2002 | Sanchez et al. | |
| 6,477,702 B1 | | 11/2002 | Yellin et al. | 717/126 |
| 6,526,571 B1 | | 2/2003 | Aizikowitz et al. | |
| 6,539,539 B1 | * | 3/2003 | Larsen et al. | 717/124 |
| 6,668,289 B1 | * | 12/2003 | Cheng et al. | 710/36 |
| 6,708,324 B1 | * | 3/2004 | Solloway et al. | 717/124 |
| 6,721,941 B1 | * | 4/2004 | Morshed et al. | 717/127 |
| 6,742,177 B1 | * | 5/2004 | Dorak et al. | 717/124 |
| 6,748,555 B1 | * | 6/2004 | Teegan et al. | 714/38 |
| 2002/0040936 A1 | | 4/2002 | Wentker et al. | |

OTHER PUBLICATIONS

Title: A Security Architecture for Computational Grids, author Foster et al, ACM, 1998.*

Title: Java resources for computer science instruction, author: Bergin et al, ACM, Dec. 1998.*

Title: Java based conservative distributed simulation , author: Alois Ferscha , Michael Richter, ACM, Dec. 1997.*

Zhao, Jianjun, "*Applying Program Dependence Analysis To Java Software*", Department of Computer Science and Engineering, pp. 1–8.

George E. Nocula, et al., "*Proof–Carrying Code*", Nov. 1996, pp. 1–60.

Joachim Posegga, et al., "*Byte Code Verification for Java Smart Cards Based on Model Checking*", Sep. 16–18, 1998, pp. 176–190.

Chan, "Infrastructure of Multi–Application Smart Card", http.//home.hkstar.com/—alanchan/papers/multiApplicationsSmartCard/, Jul. 25, 2002.

Chen, Zhiqun, "Java Card™ Technology for Smart Cards", *Sun Microsystems*, pp. 11–16, Jun., 2000.

Ritchey, Tim, "Advanced Topics: The Java Virtual Machine", *Javal*, Chapter 14, pp. 25–346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Delivers On Vision to Bring JAVA Technology to the Consumer and Embedded Market", Business Wire, Sep. 28, 1999.

"Sun Microsystems Announces JAVACARD API", Business Wire, Oct. 1996.

Sun Microsystems: "Sun's JAVA Technology Leads Open Worldwide Market for Smart Cards", M2, Presswire, May 1999.

Daniels, John et al., "Stategies For Sharing Objects in Distributed Systems", JOOP, *Object Designeres Ltd., UK*, pp. 27–36.

David Basin "Java Bytecode Verification by Model Checking" System Abstract, pp. 492–495 IT–Research Security (TZ/FE34).

Suresh Subramanian, "*Cruise: Using Interface Hierarchies to Support Software Evolution*", IEEE, 1988, pp. 132–142.

International Search Report, PCT/US 01/28579, International filing date Sep. 12, 2001, date Search Report mailed– Jan. 5, 2004.

International Search Report, PCT/US 01/28688, International filing date Sep. 14, 2001, date Search report mailed– Jan. 5, 2004.

* cited by examiner

```
package a1;  ~805
import L0;
                 ~870
      class A1 extends Object {   845
820 ─── void A10 (short s) {
           byte ba[ ] = A11(s);
                      ~850    ~830
           ...
           return;
       }
825 ─── byte[ ] A11 (int i) {
           byte ba[ ]new byte[i];
                     ~880
855 ─── ba[0] = (byte)classL0.L01(this);
           ...
           return ba;           840
       }
       ...
   } package L0; ~800
835
  ─public class classL0l {        865
       ─public static int L01 (Object o)
875 ─
           ...
       }
   }
```

|  | Virtual Stack |  |
|  | Before | After |
|  | 850 |  |
|  | int | ref: byte[ ] |
|  | ... | ... |
|  | 860 |  |
|  | ref: A1 | int |
|  | ... | ... |

API Definition

FIG. 10D

POPULATING RESOURCE-CONSTRAINED DEVICES WITH CONTENT VERIFIED USING API DEFINITIONS

CROSS REFERENCE TO RELATED APPLICATIONS

This application claims the benefit of provisional patent application Ser. No. 60/200,480 filed Apr. 28, 2000 in the name of Judith E. Schwabe, entitled "System and Method for Remote Incremental Program Verification Using API Definitions".

This application is related to the following:

U.S. patent application Ser. No. 10/661,043, filed Sep. 12, 2003 in the name of inventor Judith E. Schwabe, entitled "Remote Incremental Program Verification Using API Definitions", which is a continuation of U.S. patent application Ser. No. 09/662,503, now U.S. Pat. No. 6,651,186, filed Sep. 14, 2000 in the name of inventor Judith E. Schwabe, entitled "Remote Incremental Program Verification Using API Definition", commonly assigned herewith;

U.S. patent application Ser. No. 09/661,684, filed Sep. 14, 2000 in the name of inventor Judith E. Schwabe, entitled "Remote Incremental Program Binary Compatibility Verification Using API Definitions", commonly assigned herewith;

U.S. patent application Ser. No. 09/661,582, filed Sep. 14, 2000 in the name of inventor Judith E. Schwabe, entitled "Populating Binary Compatible Resource-Constrained Devices with Content Verified Using API Definitions", U.S. patent application Ser. No. 09/662,258, filed Sep. 14, 2000 in the name of the inventor in the name of inventor Judith E. Schwabe, entitled "API Representation Enabling Submerged Hierachy", commonly assigned herewith; and U.S. patent application Ser. No. 09/243,108, filed Feb. 2, 1999 in the name of inventors Judith E. Schwabe and Joshua Susser, entitled "Token Based Linking", commonly assigned herewith.

BACKGROUND OF THE INVENTION

1. Field of the Invention

The present invention relates to computer systems. More particularly, the present invention relates to a system and method for remote distributed program verification using API definitions.

2. Background

In general, computer programs are written as source code statements in a high level language that is easy for a human being to understand. As the computer programs are actually executed, a computer responds to machine code, which consists of instructions comprised of binary signals that directly control the operation of a central processing unit (CPU). A special program called a compiler is typically used to read the source code and to convert its statements into the machine code instructions of the specific CPU. The machine code instructions thus produced are platform dependent, that is, different computer devices have different CPUs with different instruction sets indicated by different machine codes.

More powerful programs are typically constructed by combining several simpler programs. This combination can be made by copying segments of source code together before compiling and then compiling the combined source. When a segment of source code statements is frequently used without changes, it is often preferable to compile it once, by itself, to produce a module, and to combine the module with other modules only when that functionality is actually needed. This combining of modules after compilation is called linking. When the decision on which modules to combine depends upon run time conditions and the combination of the modules happens at run time, just before execution, the linking is called dynamic linking.

Object Oriented Principles

Object oriented programming techniques such as those used by the Java™ platform are widely used. The basic unit of object oriented programs is an "object". An object has methods (procedures) and fields (data). The term "members" is used herein to refer to methods and fields. A method declares executable code that can be invoked and that passes a fixed number of values as arguments. A class defines the shared members of the objects. Each object then is a particular instance of the class to which it belongs. In practice, a class is a template to create multiple objects (multiple instances) with similar features.

One property of classes is encapsulation. Encapsulation is used to describe a system wherein access to an object is provided through an interface, while keeping the details private. In other words, the actual implementation of the members within the class is hidden from an outside user and from other classes, except as exposed by an interface. This makes classes suitable for distributed development, for example by different developers at different sites on a network. A complete program can be formed by assembling the classes that are needed, linking them together, and executing the resulting program.

Classes enjoy the property of inheritance. Inheritance is a mechanism that enables one class to inherit all of the members of another class. The class that inherits from another class is called a subclass; the class that provides the attributes is the superclass. Symbolically, this can be written as subclass <=superclass, or superclass =>subclass. The subclass can extend the capabilities of the superclass by adding additional members. The subclass can override a virtual method of the superclass by providing a substitute method with the same name and type.

The members of a class type are fields and methods; these include members inherited from the superclass. The class file also names the superclass. A member can be public, which means that it can be accessed by members of the class that contains its declaration. A member can also be private. A private field of a class is visible only in methods defined within that class. Similarly, a private method may only be invoked by methods within the class. Private members are not visible within subclasses, and are not inherited by subclasses as other members are. A member can also be protected.

An interface type is a type whose members are constants and abstract methods. This type has no implementation, but otherwise unrelated classes can implement it by providing implementations for its abstract methods. Interfaces may have sub-interfaces, just as classes may have subclasses. A sub-interface inherits from its super-interface, and may define new methods and constants as well. Additionally, an interface can extend more than one interface at a time. An interface that extends more than one interface inherits all the abstract methods and constants from each of those interfaces, and may define its own additional methods and constants.

Java™ Programming Language

In the Java™ programming language, classes can be grouped and the group can be named; the named group of classes is a package. If a class member is not declared with any of the public, private or protected keywords, then it is visible only within the class that defines it and within classes that are part of the same package. A protected member may be accessed by members of declaring class or from anywhere in the package in which it is declared. The Java™ programming language is described in detail in Gosling, et al., "The Java™ Language Specification", August 1996, Addison-Wesley Longman, Inc.

Java™ Virtual Machine

Programs written in the Java™ language execute on a Java™ virtual machine (JVM), which is an abstract computer architecture that can be implemented in hardware or software. Either implementation is intended to be included in the following description of a VM. For the purposes of this disclosure, the term "processor" may be used to refer to a physical computer or a virtual machine.

A virtual machine is an abstract computing machine generated by a software application or sequence of instructions that is executed by a processor. The term "architecture-neutral" refers to programs, such as those written in the Java™ programming language, which can be executed by a virtual machine on a variety of computer platforms having a variety of different computer architectures. Thus, for example, a virtual machine implemented on a Windows™ based personal computer system will execute an application using the same set of instructions as a virtual machine implemented on a UNIX™-based computer system. The result of the platform-independent coding of a virtual machine's sequence of instructions is a stream of one or more bytecodes, each of which is, for example, a one-byte-long numerical code.

The Java™ Virtual Machine (JVM) is one example of a virtual machine. Compiled code to be executed by the Java™ Virtual Machine is represented using a hardware- and operating system-independent binary format, typically stored in a file, known as the class file format. The class file is designed to handle object oriented structures that can represent programs written in the Java™ programming language, but may also support several other programming languages. These other languages may include, by way of example, Smalltalk. The class file format precisely defines the representation of a class or interface, including details such as byte ordering that might be taken for granted in a platform-specific object file format. For the sake of security, the Java™ Virtual Machine imposes strong format and structural constraints on the instructions in a class file. In particular example, JVM instructions are type specific, intended to operate on operands that are of a given type as explained below. Any language with functionality that can be expressed in terms of a valid class file can be hosted by the Java™ Virtual Machine. The class file is designed to handle object oriented structures that can represent programs written in the Java™ programming language, but may also support several other programming languages. The Java™ Virtual Machine is described in detail in Lindholm, et al., "The Java™ Virtual Machine Specification", April 1999, Addison-Wesley Longman, Inc., Second Edition.

The process of programming using such a VM then has two time periods associated with it; "compile time" refers to the steps which convert the high level language into VM instructions, and "run time" refers to the steps which, in a Java™ VM environment, interpret instructions to execute the module. Between compile time and run time, the modules of instructions compiled from statements can reside dormant for extended, arbitrary periods of time, or can be transferred from one storage device to another, including being transferred across a network.

Loading refers to the process of finding the binary form of a class or module with a particular name, typically by retrieving a binary representation previously compiled from source code. In the JVM, the loading step retrieves the class file representing the desired class. The loading process is implemented by the bootstrap loader or a user defined class loader. A user-defined class loader is itself defined by a class. A class loader may indicate a particular sequence of locations to search in order to find the class file representing a named class.

Linking in the JVM is the process of taking a binary form of a class in memory and combining it into the run time state of a VM, so that it can be executed. A class is loaded before it is linked.

Verification

For many reasons, particularly regarding the integrity of downloaded computer programs, the Internet and other insecure communication mediums are potentially "hostile" environments. A downloaded program may contain errors involving the data types of operands not matching the data type restrictions of the instructions using those operands, which may cause the program to fail during execution. Even worse, a program might attempt to create object references (e.g. by loading a computed number into the operand stack and then attempting to use the computed number as an object handle) and to thereby breach the security and/or integrity of the user's computer. Alternatively, one or more of the modules may have been updated since the others were prepared. It is therefore prudent, when assembling several modules that may have been written independently, to check both that (1) each module properly adheres to the language semantics and that (2) the set of modules properly adheres to the language semantics. These checks are typically performed on program modules containing instructions produced from compiled source code. By analogy with the terminology used by the designers of the Java™ programming language, this post-compilation module checking can be called verification. A verifier, therefore, performs an essential role in ensuring a secure runtime environment.

The binary classes of the JVM are examples of general program modules that contain instructions produced from compiled source statements. Context sensitivity of validity checks performed during verification means that those checks depend on information spread across more than one module, i.e., those checks are called inter-module checks herein. Validity checks that do not require information from another module are called intra-module checks herein. Intra-module checks include, for example, determining whether the downloaded program will underflow or overflow its stack, whether any instruction will process data of the wrong type and whether the downloaded program will violate files and other resources on the user's computer. See, for example, U.S. Pat. No. 5,668,999 to Gosling, U.S. Pat. No. 5,748,964 to Gosling and U.S. Pat. No. 5,740,441 to Yellin et al.

During normal execution of programs using languages that do not feature pre-execution verification, the operand stack must be continuously monitored for overflows (i.e., adding more data to the stack than the stack can store) and underflows (i.e., attempting to pop data off the stack when the stack is empty). Such stack monitoring must normally be performed for all instructions that change the stack's status (which includes most all instructions). For many programs, stack monitoring instructions executed by the interpreter account for approximately 80% of the execution time of an interpreted computer program.

Turning now to FIG. 1, a high level flow diagram that illustrates verification is presented. At 10, intra-module checks are performed to determine whether a module is internally consistent. At 20, inter-module checks are performed to determine whether the module is consistent within the context of externally referenced modules. Verification is successful if both checks pass. Execution of a module is prevented if either checks fail.

Verification typically follows an execution path. Verification starts at a program's main entry point and proceeds in a "top down" fashion, one instruction at a time. During this process, the verifier may encounter a reference to an external library that includes at least one program unit. At this point, the verifier obtains the binary file for the external library and continues verification along an execution path.

Turning now to FIG. 2, a high level flow diagram that illustrates verification of an application to be executed on a resource-rich device 62 is presented. Verification is typically performed on a relatively resource-rich device 62 such as a desktop computer. A compiler 50 compiles a source file 55. During compilation, the compiler 50 verifies the correct use of data and instructions. These checks include intra-module checks and inter-module checks. The output of the source code compiler 50 is a binary file 60 containing the executable instructions corresponding to the source file 55. When the binary file 60 is referenced by an application executing on a virtual machine 65, a loader 70 loads the binary file 60. A verifier 75 verifies the binary file 60 at some point prior to execution by an interpreter 80. If the binary file 60 references any items that are external to the binary file 60, the verifier 75 verifies the binary file 60 against the referenced binary file(s) 60 containing the externally referenced item(s).

Turning now to FIG. 3, a block diagram that illustrates the need for verification is presented. FIG. 3 is the same as FIG. 2, except that binary file 110 and/or referenced binary file 107 are potentially modified at some point after source file 105 is compiled. The modification may be the result of an update of a binary file 110 or referenced binary file 107. Alternatively, modification of the binary file 110 or referenced binary file 107 may be the result of file corruption. As mentioned previously, such program modifications could potentially cause the program to violate Java™ semantics and thus breach the security and/or integrity of the host computer 155.

Note that some updates in FIG. 3 are allowed. Some changes made when revising a binary file result in the new version being backward compatible with the previous version. When a newer version is backward compatible with an older version, the versions are said to be binary compatible. Binary compatibility is discussed in greater detail below. A verification error should be indicated when versions are not binary compatible. Thus, some updates may pass verification, but corrupted binary files must not pass verification.

Verification coupled with execution time has some disadvantages. For example, in an object oriented programming language system like the Java™ platforms (but not Java Card™ platforms), it leads to a verifier initiating class loading when the verifier needs to check subtype relations among classes not already loaded. Such loading can occur even if the code referencing other classes is never executed. Because of this, loading can consume memory and slow execution at run time as compared to a process that does not load the classes unless they are referenced by the instructions that are actually executed.

Methods for verification coupled with execution time typically do not verify one class or module at a time before run time. This is a disadvantage because classes cannot be verified ahead of time, e.g. before run time, so verification must incur a run time cost. Thus, there is a need for module-by module, also called module-at-a-time, verification before run time. Such verification is also called pre-verification because technically it is distinct from the verification which occurs during run time linking by the Java Card™ Virtual Machine (JCVM).

Also, since verification is typically performed at run time, a class that has been run once, and passed verification, is subjected to verification again each time the class is loaded—even when reverification is not required. Reverification may not be required, for example, when the class is being used in the same application on the same processor, or in an environment that prevents changes that would affect verification. This can lead to redundant verification, thereby requiring more memory and executing more slowly during run time than ought to be necessary. Thus, there is a need for an option to use verified modules without further, or with minimum verification at run time.

Resource-Constrained Devices

Resource-constrained devices are generally considered to be those that are relatively restricted in memory and/or computing power or speed, as compared to typical desktop computers and the like. Other resource-constrained devices include, by way of example, smart cards, cellular telephones, boundary scan devices, field programmable devices, personal digital assistants (PDAs) and pagers and other miniature or small footprint devices.

Smart cards, also known as intelligent portable data-carrying cards, are a type of resource-constrained device. Smart cards are typically made of plastic or metal and have an electronic chip that includes an embedded microprocessor or microcontroller to execute programs and memory to store programs and data. Such devices, which can be about the size of a credit card, typically have computer chips with 8-*bit* or 16 bit architectures. Additionally, these devices typically have limited memory capacity. For example, some smart cards have less than one kilobyte (1K) of random access memory (RAM) as well as limited read only memory (ROM), and/or non-volatile memory such as electrically erasable programmable read only memory (EEPROM).

A Java™ virtual machine executes programs written in the Java™ programming language and is designed for use on desktop computers, which are relatively rich in memory. It would be desirable to write programs that use the full implementation of the Java™ virtual machine for execution on resource-constrained devices such as smart cards. However, due to the limited architecture and memory of resource-constrained devices such as smart cards, the full Java™ virtual machine platform cannot be implemented on such devices. Accordingly, a separate Java Card™ (the smart card that supports the Java™ programming language) technology supports a subset of the Java™ programming language for resource-constrained devices.

Referring to FIG. 4, development of an applet for a resource-constrained device, such as a smart card 160, begins in a manner similar to development of a Java™ program. In other words, a developer writes one or more Java™ classes and compiles the source code with a Java™ compiler to produce one or more class files 165. The applet can be run, tested and debugged, for example, on a workstation using simulation tools to emulate the environment on the card 160. When the applet is ready to be downloaded to the card 160, the class files 165 are converted to a converted applet (CAP) file 175 by a converter 180. The converter 180 can be a Java™ application being executed by a desktop computer. The converter 180 can accept as its input one or more export files 185 in addition to the class files 165 to be converted. An export file 185 contains naming or linking information for the contents of other packages that are imported by the classes being converted.

Referring to FIG. 5, the CAP format is parallel to the class file information. Each CAP 250 contains all of the classes and interfaces defined in one Java™ package. A CAP file 250 has a compact and optimized format, so that a Java™ package can be efficiently stored and executed on resource-constrained devices. Among other things, the CAP file 250 includes a constant pool component (or "constant pool") 255 that is packaged separately from a methods component 260. The constant pool 255 can include various types of constants including method and field references which are resolved either when the program is linked or downloaded to the smart card or at the time of execution by the smart card. The methods component 260 specifies the application instructions to be downloaded to the smart card and subsequently executed by the smart card. Also included in a CAP file 250, among other things, are class definitions 265, field definitions 275, and descriptive type definitions 275.

Referring again to FIG. 4, after conversion, the CAP file 175 can be stored on a computer-readable medium 170 such as a hard drive, a floppy disk, an optical storage medium, a flash device or some other suitable medium. Or the computer-readable medium can be in the form of a carrier wave, e.g., a network data transmission or a radio frequency (RF) data link.

The CAP file 175 then can be copied or transferred to a terminal 190 such as a desktop computer with a peripheral card acceptance device (CAD) 195. The CAD 195 allows information to be written to and retrieved from the smart card 160. The CAD 195 includes a card port (not shown) into which the smart card 160 can be inserted. Once inserted, contacts from a connector press against the surface connection area on the smart card 160 to provide power and to permit communications with the smart card 160, although, in other implementations, contactless communications can be used. The terminal 190 also includes an installation tool 200 that loads the CAP file 175 for transmission to the card 160.

The smart card 160 has an input/output (I/O) port 205 which can include a set of contacts through which programs, data and other communications are provided. The card 160 also includes a loader 210 for receiving the contents of the CAP file 175 and preparing the applet for execution on the card 160. The installation tool 210 can be implemented, for example, as a Java™ program and can be executed on the card 160. The card 160 also has memory, including volatile memory such as RAM 240. The card 160 also has ROM 230 and non-volatile memory, such as EEPROM 235. The applet prepared by the loader 210 can be stored in the EEPROM 235.

As mentioned regarding FIG. 2, verification is typically performed on a resource-rich device. Verification programs are typically large programs that require a relatively large amount of runtime memory when executing. Also, verifier programs typically require large amounts of detailed descriptive information in the verification process. This descriptive information includes information regarding field types, signature types and access flags (private, protected, etc). This type information is typically maintained in secondary storage. Such memory requirements are typically not an issue on relatively resource rich devices such as a desktop computer. However, these same characteristics make verification ill-suited for resource-constrained devices such as smart cards. Providing verification of program modules to execute on a resource-constrained device is critical to ensure the integrity of program modules executed such a device. Accordingly, a need exists in the prior art for a system and method for remote verification of programs to be executed by a resource-constrained device.

As mentioned previously, a Java™ verifier proceeds along an applet's execution path, verifying all external references in the process. This means that the verifier must have access to the full binary file of not only the module to be verified, but also all modules in the execution path of the module to be verified. However, some of the libraries may contain proprietary implementations that must not be revealed to consumers. For example, a vendor may install a library that contains proprietary implementation algorithms (such as an encryption algorithm) that must not be revealed to another vendor. Since typical verification methods require revealing the binary files of the modules to be verified, such methods could reveal proprietary information. Accordingly, there is a need in the prior art for a system and method for program verification that does not reveal proprietary details.

Moreover, a library may have multiple implementations. Verification with a particular implementation does not guarantee verification with another implementation. Accordingly, there is a need in the prior art for a system and method for specifying when verification with a first implementation guarantees verification with a second implementation.

Program Module Hierarchical Dependencies

FIG. 6 shows a diagram illustrating typical hierarchical dependencies among a group of program packages (including both libraries and program applets) loaded onto a smart card. Applications may be loaded onto smart card incrementally and linked on-card for execution so that the functionality of the smart card may be updated with additional capabilities in addition to factory-programmed functionalities. In the diagram, a Java™ language framework 285 and a Java Card™ framework 280 exist at a Java Card™ API level. Above the Java Card™ API level is a custom API level with one or more custom frameworks 290. The custom framework 290 may be supplied by one or more value added providers through various software development kits (SDKs) to extend an existing framework or other API. At the highest level is an application level where various applets 295, 300 and 305 reside.

Each of the boxes shown in FIG. 6 represents a Java™ package. A package is called a library package if it exports items and is therefore referenced by other packages. A package is called an applet package if it contains a program entry point. Some packages are both library and applet packages.

As shown in FIG. 6, a package may depend on other packages at the same API level or from those packages in lower API levels. The Java Card™ framework 280 may have dependencies from the Java™ language framework 285. Moreover, the custom framework 290 at the custom API level and the applets 300 and 305 may have references that depend from the Java Card™ framework 280. In turn, the applet 295 may have references that depend on the custom framework 290. The applet 295 and the custom framework 290 may also depend on the Java™ language framework 285. Applets may also depend on one another as shown by the line from Applet 305 to Applet 300. In this case, Applet 300 is both an applet and library package.

Although the example of FIG. 6 shows linear dependencies, non-linear dependencies such as circular dependencies may be supported using a suitable converter and installation tool.

Post-Issuance Install

The Java Card™ CAP file format provides for the post issuance installation of applications. In other words, the CAP file allows the content of a resource-constrained device to be updated after the device has been issued to an end user. The capability to install applications after the card has been issued provides card issuers with the ability to respond dynamically to their customer's changing needs. For example, if a customer decides to enroll in the frequent flyer program associated with the card, the card issuer can add this functionality, without having to issue a new card.

The Java Card™ CAP file format thus provides more flexibility for application issuers. Application issuers may implement transactional services as applets, and then host these applets, either in their own cards or in the cards of other issuers with whom they do business. For example, an issuer may provide a core service to clients in the form of Java™ applets for the issuer's cards. The clients will then combine these applets with other applets designed to provide a variety of value added services. These applet combinations can be updated through the dynamic applet loading process to meet the changing needs of individual customers.

Turning now to FIG. 7, a block diagram that illustrates preparation of a resource-constrained device without post-issuance installation is presented. A manufacturer typically prepares the resource-constrained device by loading it with some initial content (310). This initial content typically includes the native OS, Java Card™ VM and some or all of the Java Card™API packages (320). Some initial applets and/or libraries may be provided by an applet or library provider (315). The initial content is burned into ROM. This process of writing the permanent components into the non-mutable memory of a chip for carrying out incoming commands is called masking. The manufacturer may also load general data onto the card's non-volatile memory. This data is identical across a large number of cards and is not specific to an individual. An example of this general data is the name of a card manufacturer.

Typically, the manufacturer also personalizes the content of a card by assigning the card to a person. This may occur through physical personalization or through electronic personalization. Physical personalization refers to permanently marking by, for example, embossing or laser engraving the person's name and card number on the physical surface of a card. Electronic personalization refers to loading personal data into a card's non-volatile memory. Examples of personal data include a person's name, personal ID or PIN number, and personal key.

Next, an issuer 320 obtains an initialized device from the manufacturer. The issuer may obtain additional applets or libraries from a provider and load the additional content onto the device. This further customization of the cards is performed by installing the applets or libraries in the form of CAP files. The issuer may also load general data, such as the issuer name, into the card's non-volatile memory.

After preparing the cards (320), the issuer disables subsequent installation of libraries or applets on the device and distributes the device to an end user 325. At this point, the card is ready for use having its complete content. Since installation has been disabled, no further content will be added after the card has been issued. The card may be obtained from an issuer, or it can be bought from a retailer. Cards sold by a retailer can be general-purpose, in which case personalization is often omitted.

Turning now to FIG. 8, a block diagram that illustrates preparation of a resource-constrained device with post-issuance installation is presented. The diagram illustrates the case where a "trusted" installer 330 installs additional content on the device after the device has been issued to the end user 335. The post-issuance installer 330 is "trusted" because of a preexisting agreement between the post-issuance installer 330 and the issuer 340. In this case, the issuer 340 distributes the device to the end user 335 without disabling subsequent installations. The end user may update the content of the resource-constrained device by presenting it to a "trusted" post-issuance installer 330. The "trusted" post-issuance installer 330 installs additional content on the resource-constrained device and returns it to the end user 335. The installation is performed by transmitting a CAP file to the device.

In the scenario illustrated in FIGS. 7 and 8, the roles of the manufacturer, issuer, services provider and applet provider are described. These roles can be filled by one or more entities.

Typically, each of the roles described in FIGS. 7 and 8 entail testing the applets and packages before they are installed on the device. Testing checks the functional behavior of these modules, confirming that given a particular input a required output is produced. Testing examines a different domain than verification, described above.

A Java Card™ system may be constructed incrementally and at each stage, it is desirable to ensure program integrity. For example, the manufacturer may populate a resource-constrained device with one or more libraries. Before shipping, it would be desirable for the manufacturer to guarantee the content integrity. At this stage, there are only libraries on the device, and no applets. Without an applet, there is no applet entry point and therefore no execution path for a verifier to follow. If an issuer then adds an applet, it would be desirable continue to ensure the content integrity. Accordingly, a need exists in the prior art for a system and method for remote program verification that accounts for iterative installation. There is a further need for a system and method for resource-constrained device program verification that protects against untrusted post-issuance installers.

Binary Compatibility

In Java Card™ technology, a change to a type in a Java™ package results in a new CAP file. A new CAP file is binary compatible with a preexisting CAP file if another CAP file converted using the export file of the preexisting CAP file can link with the new CAP file without errors.

The Java™ Language Specification includes several examples of binary compatible changes for the Java™ language. These examples include adding a class and adding a field to a class. Examples of binary incompatible changes include deleting a class and changing the parameters to a method.

The Java Card™ Virtual Machine specification defines binary compatible changes to be a strict subset of those defined for the Java™ programming language. An example of a binary compatible change in the Java™ programming language that is not binary compatible in the Java Card™ platform is adding a public virtual method to a class that can be extended by a referencing binary file.

Turning now to FIG. 9, a block diagram that illustrates binary compatibility is presented. FIG. 9 shows an example of binary compatible CAP files, P1 (360) and P1' (365). The preconditions for the example are: The package P1 is converted to create the P1 CAP file (360) and P1 export file (370), and package P1 is modified and converted to create the P1 CAP file (365). Package P2 imports package P1, and therefore when the P2 CAP file (375) is created, the export file of P1 (370) is used. In the example, P2 is converted using the original P1 export file (370). Because P1' is binary compatible with P1, P2 may be linked with either the P1 CAP file (360) or the P1 CAP file (365).

The Java Card™ Virtual Machine further specifies that major and minor version numbers be assigned to each revision of a binary file. These version numbers are record in both CAP and export files. When the major version numbers of two revisions are not equal, the two revisions are not binary compatible. When the major version numbers of the two revisions are equal, the revision with the larger minor version number is binary (backward) compatible with the revision with the smaller minor version number.

The major and minor versions of a package are assigned by the package provider. A major version is changed when a new implementation of a package is not binary compatible with the previous implementation. The value of the new major version is greater than the version of the previous implementation. When a major version is changed, the associated minor version is assigned the value of 0.

When a new implementation of a package is binary compatible with the previous implementation, it is assigned a major version equal to the major version of the previous implementation. The minor version assigned to the new implementation is greater than the minor version of the previous implementation.

Both an export file and a CAP file contain the major and minor version numbers of the package described. When a CAP file is installed on a Java Card™ enabled device, a resident image of the package is created, and the major and minor version numbers are recorded as a part of that image. When an export file is used during preparation of a CAP file, the version numbers indicated in the export file are recorded in the CAP file.

During installation, references from the package of the CAP file being installed to an imported package can be resolved only when the version numbers indicated in the export file used during preparation of the CAP file are compatible with the version numbers of the resident image. They are compatible when the major version numbers are equal and the minor version of the export file is less than or equal to the minor version of the resident image.

Any modification that causes binary incompatibility in Java Card™ systems may cause an error at run time. Accordingly, an additional need exists in the prior art for a system and method for program verification that ensures binary compatibility.

SUMMARY OF THE INVENTION

A method for remote incremental program verification includes receiving content verified by at least one content provider, installing the content on a resource-constrained device and issuing the resource-constrained device to an end user. The content includes at least one program unit and each program unit includes an Application Programming Interface (API) definition file and an implementation. Each API definition file defines items in its associated program unit that are made accessible to one or more other program units and each implementation includes executable code corresponding to the API definition file. The executable code includes type specific instructions and data. According to one aspect, subsequent installation of content on the resource-constrained device is disabled. A resource-constrained device includes a memory for providing content verified by at least one content provider and a virtual machine that is capable of executing instructions included within the content. The content includes at least one program unit and each program unit includes an Application Programming Interface (API) definition file and an implementation. Each API definition file defines items in its associated program unit that are made accessible to one or more other program units, each implementation includes executable code corresponding to the API definition file, and executable code includes type specific instructions and data.

BRIEF DESCRIPTION OF THE DRAWINGS

FIG. 10D is a code sample that illustrates verification that follows an execution path to an API in accordance with one embodiment of the present invention.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to a system and method for remote distributed program verification using API definition files. The invention further relates to machine-readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to embodiments of the present invention, a verifier uses API definition files of program modules to perform inter-module consistency checks. Each program has an associated verification status value that is True if the program's integrity is verified by the verifier, and it is otherwise set to False. Use of the verifier in accordance with the present invention enables verification of a program's integrity and allows the use of an interpreter that does not execute the usual stack monitoring instructions during program execution, thereby greatly accelerating the program interpretation process.

According to embodiments of the present invention, verification does not continue beyond an API definition file. This differs from typical verification methods that continue the verification process into an implementation of the API definition file. An API definition file defines the context of a binary file in relationship to other referenced binary files. Once it is shown that binary files are implemented in accordance with their API definition files, binary files that reference items in other binary files need only look to the API definition files of whatever binary files implement those items to determine whether two binary files are compatible. Verifying that a binary file is implemented in accordance with its API thus obviates the need for other binary files that reference the verified binary file to continue the verification process into the verified binary file because it has already been verified. Using API definition files in accordance with the present invention therefore provides a mechanism for making conclusions regarding whether a referencing program passes verification, without the disadvantages of typical known verification methods.

Figure 1:
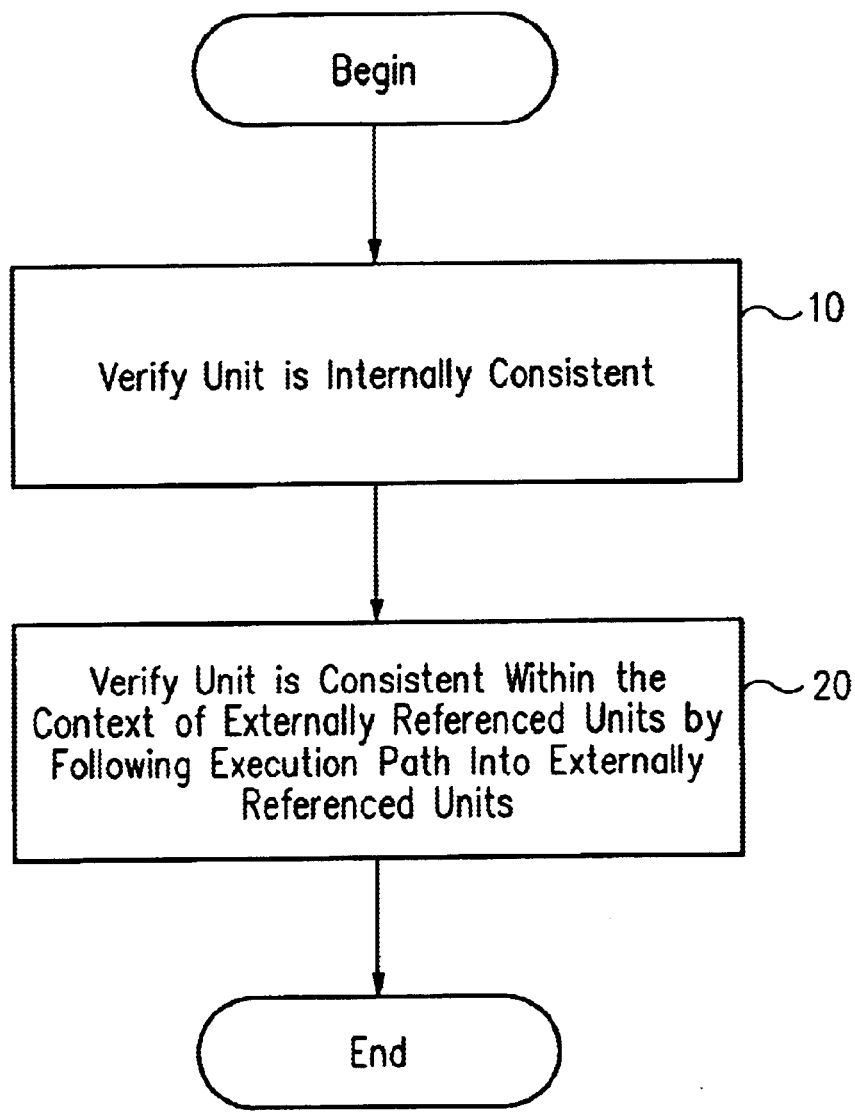
FIG. 1 is a high level flow diagram that illustrates program verification.
Figure 2:
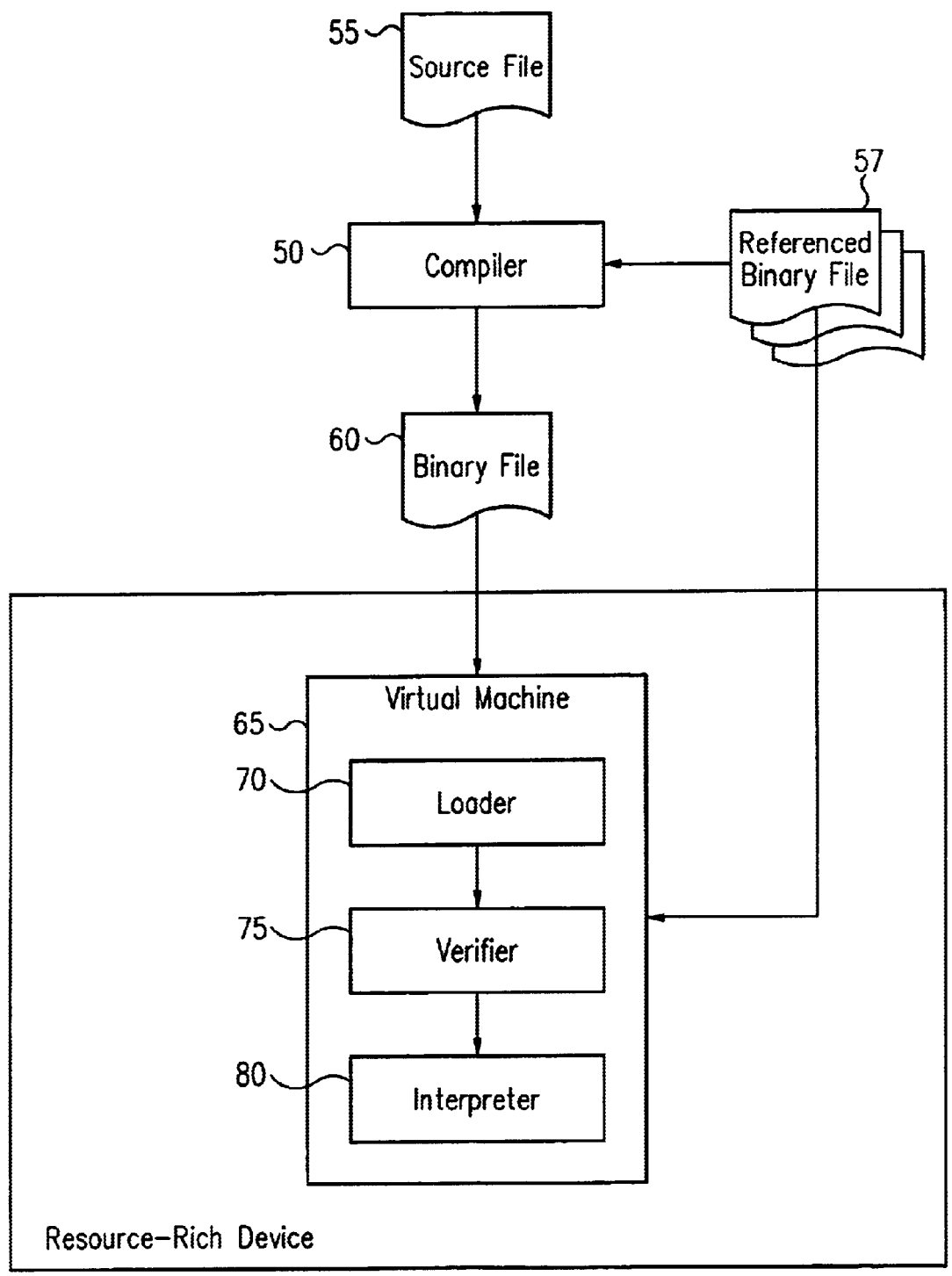
FIG. 2 is a high level flow diagram that illustrates verification of an application to be executed on a resource-rich device.
Figure 3:
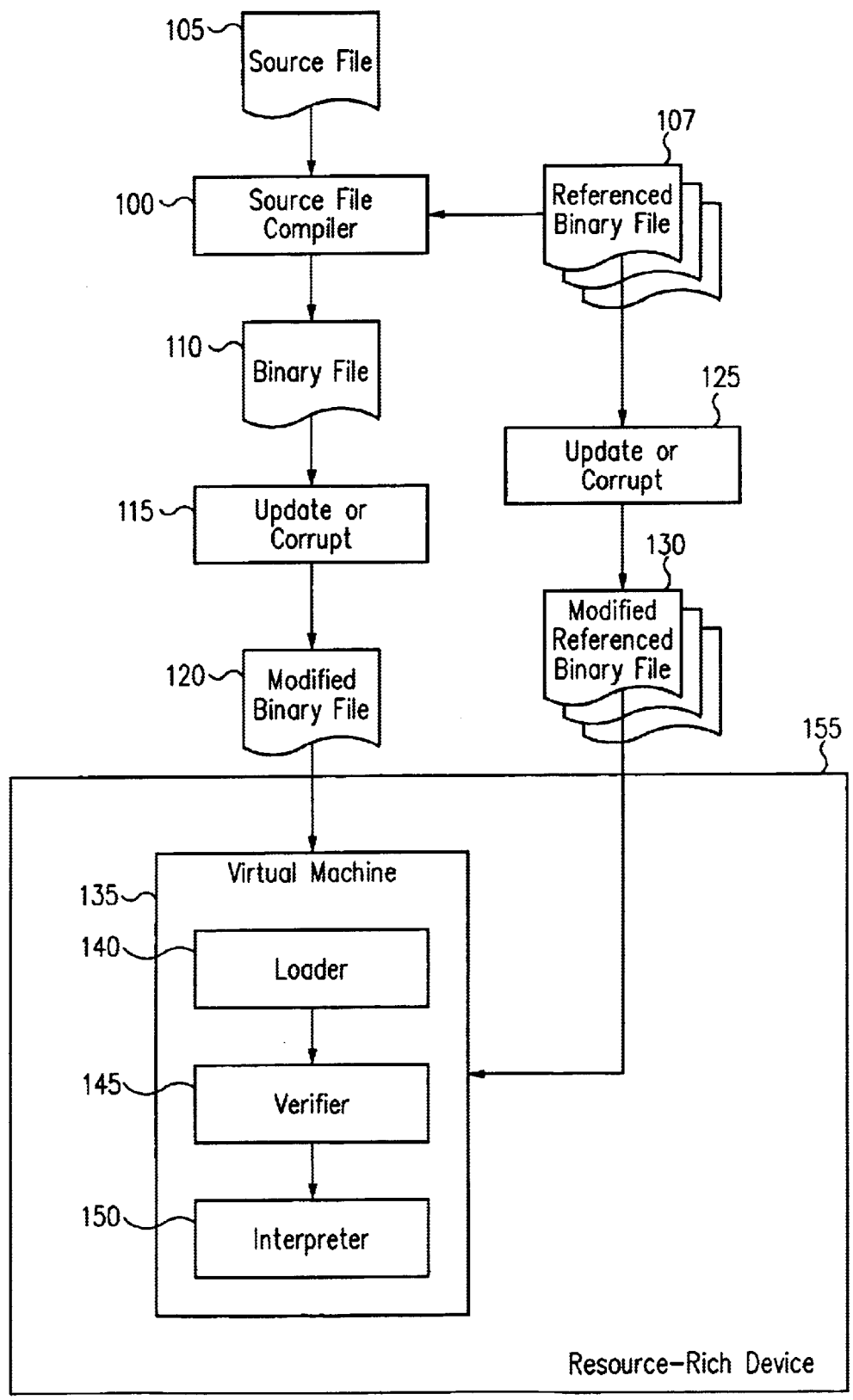
FIG. 3 is a block diagram that illustrates the need for program verification.
Figure 4:
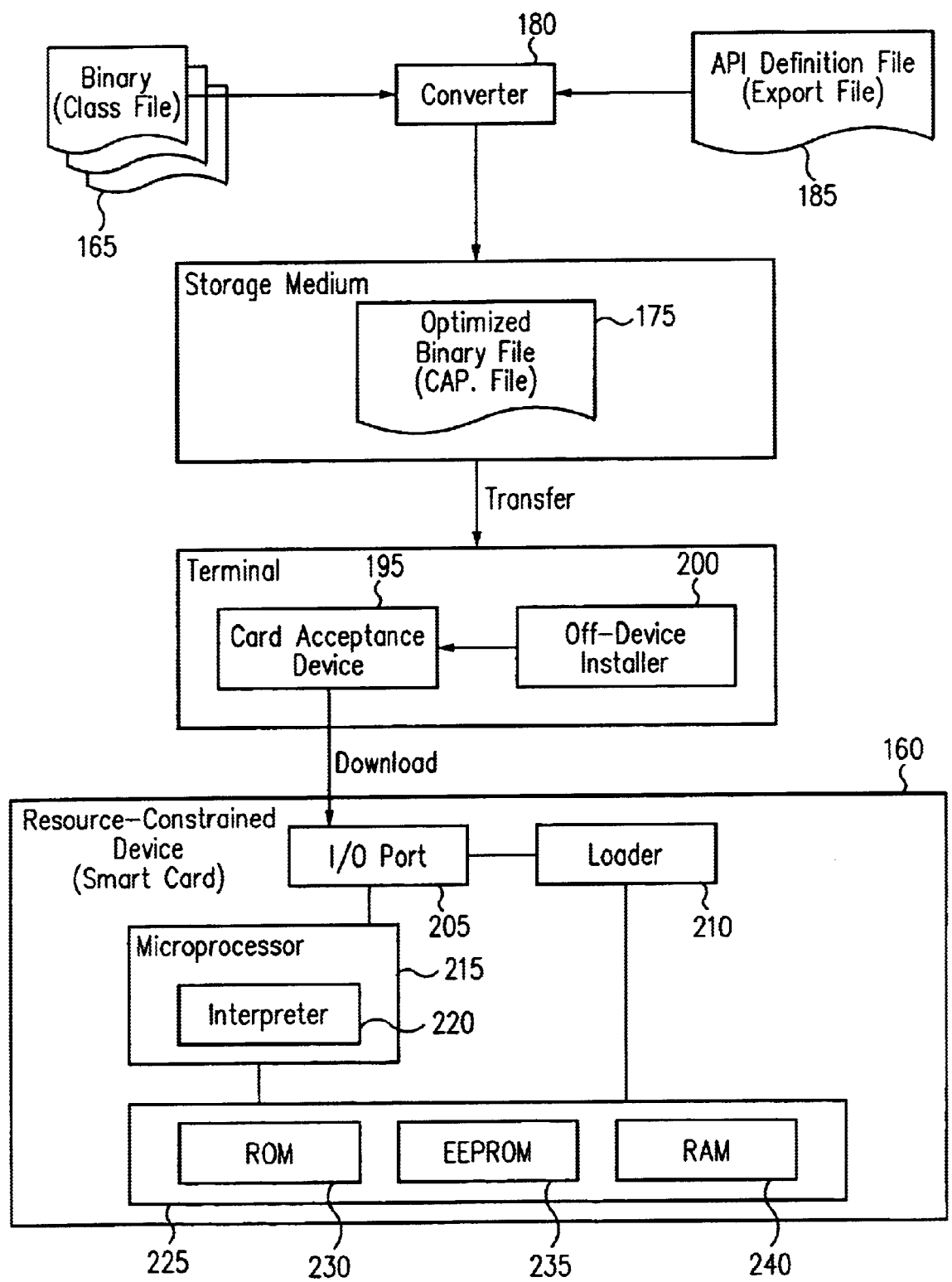
FIG. 4 is a block diagram that illustrates development of an applet for a resource-constrained device.
Figure 5:
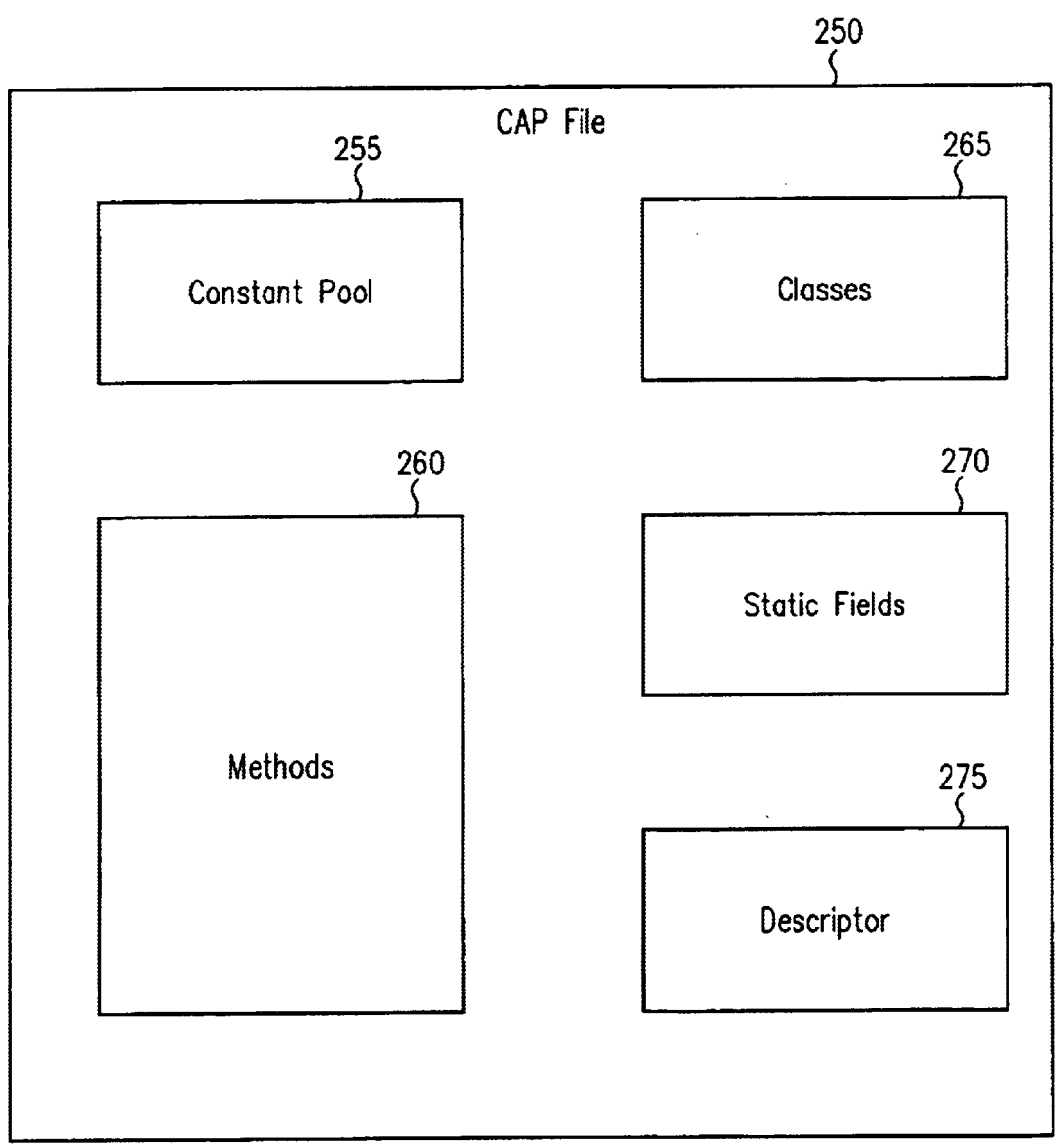
FIG. 5 is a block diagram that illustrates a Converted Applet (CAP) file format.
Figure 6:
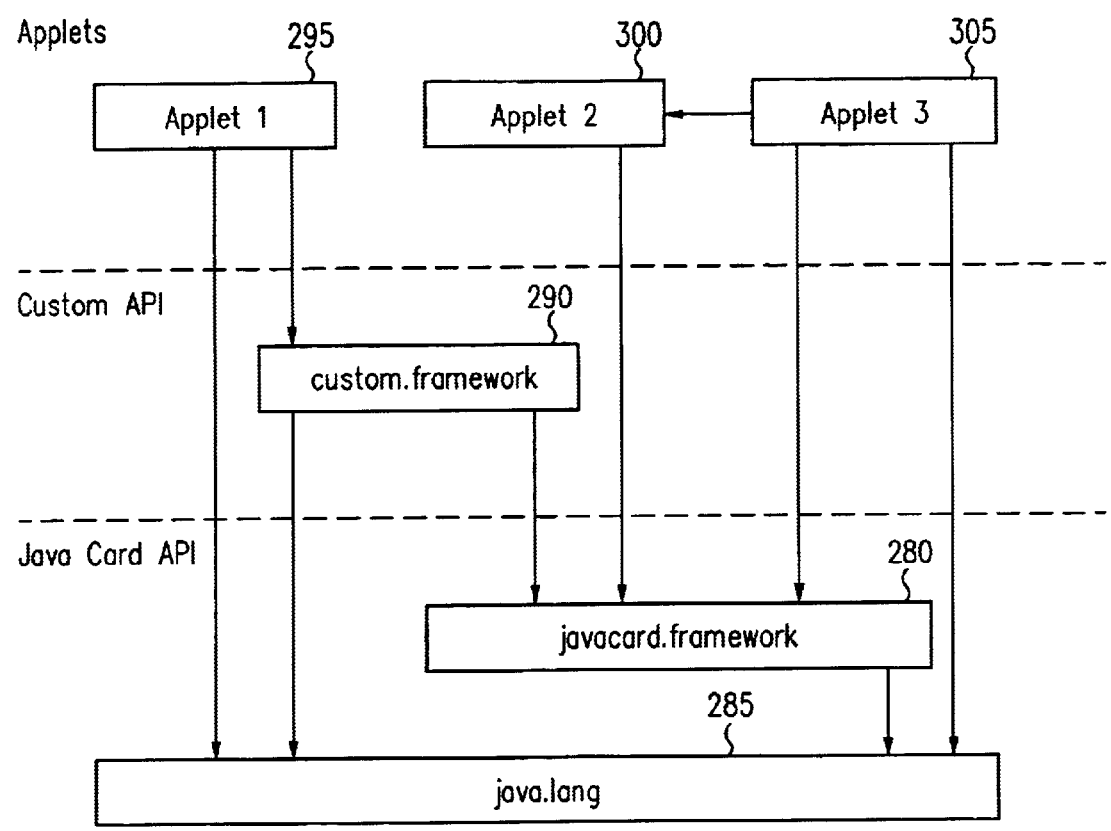
FIG. 6 is a block diagram that illustrates hierarchical dependencies between application packages.
Figure 7:
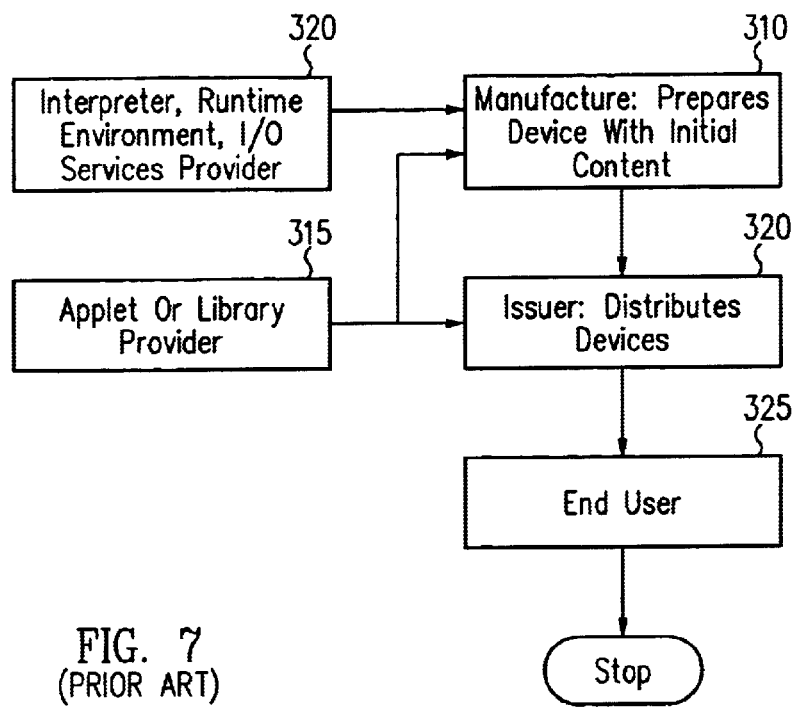
FIG. 7 is a block diagram that illustrates preparation of a resource-constrained device without post-issuance install.
Figure 8:
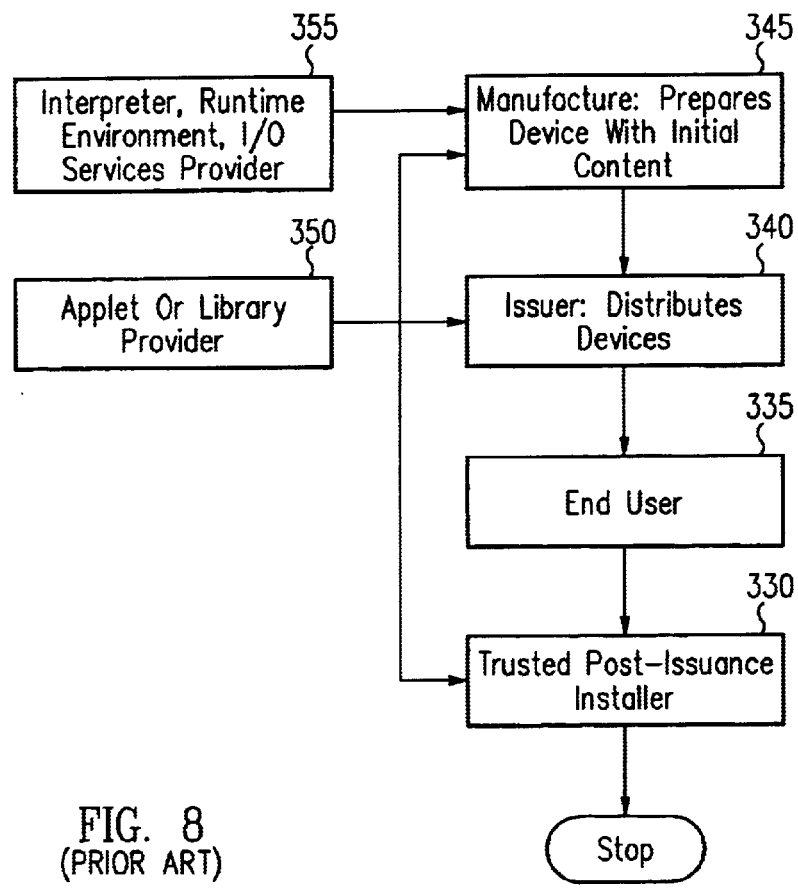
FIG. 8 is a block diagram that illustrates preparation of a resource-constrained device with post-issuance install.
Figure 9:
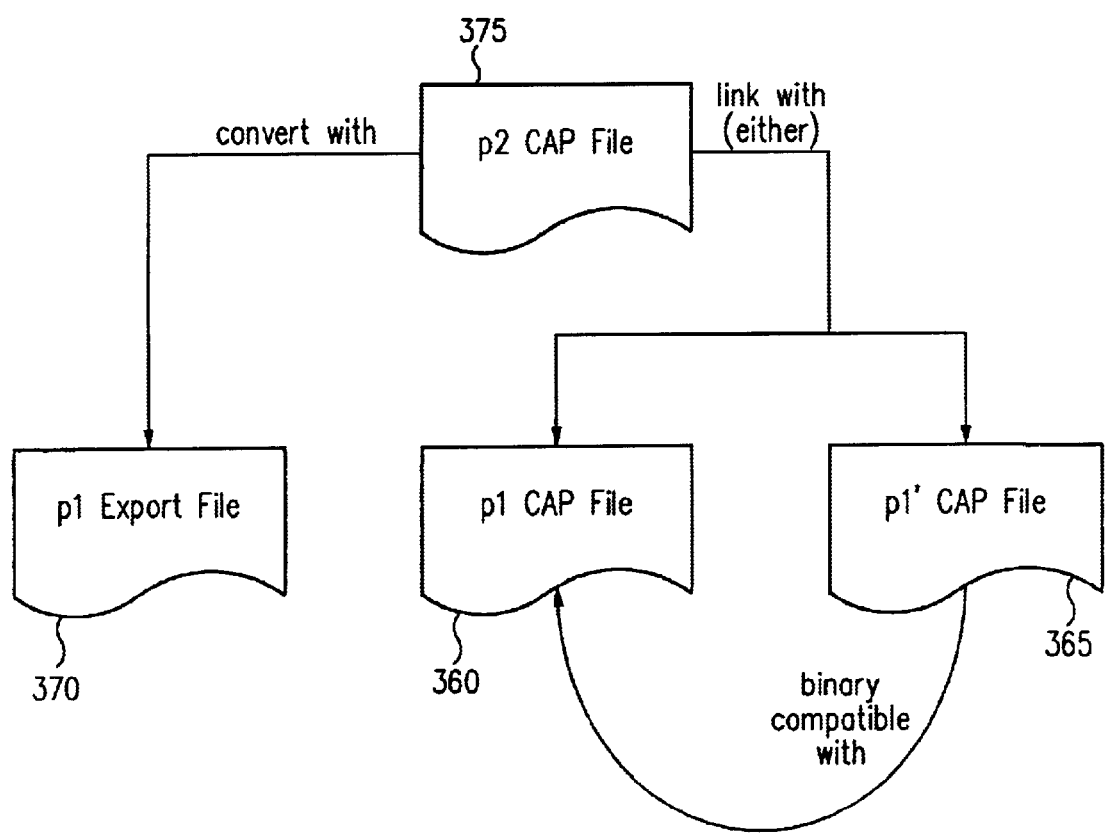
FIG. 9 is a block diagram that illustrates binary compatibility.
Figure 10A:
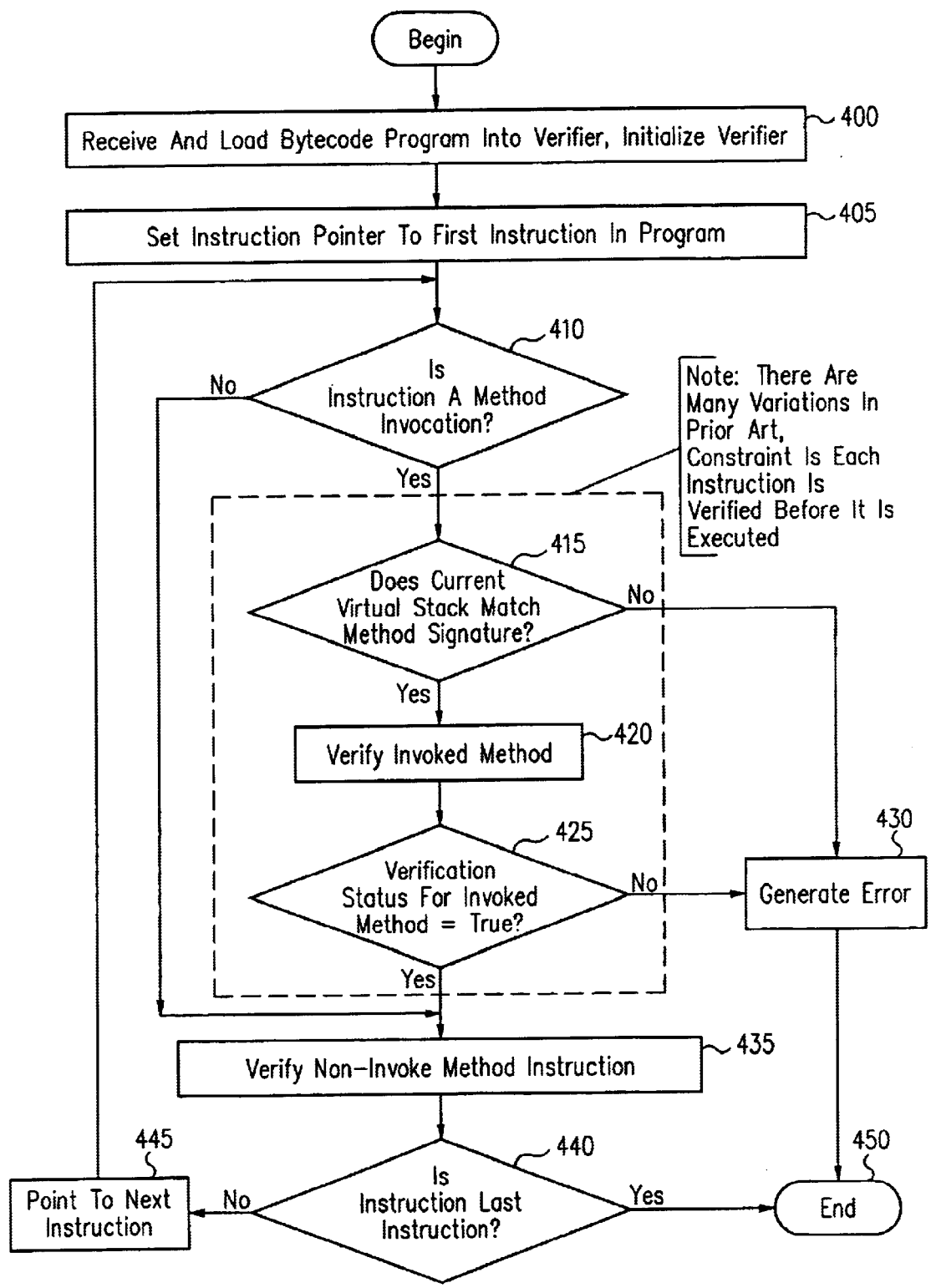
FIG. 10A is a flow diagram that illustrates verification that follows an execution path.
Figure 10B:
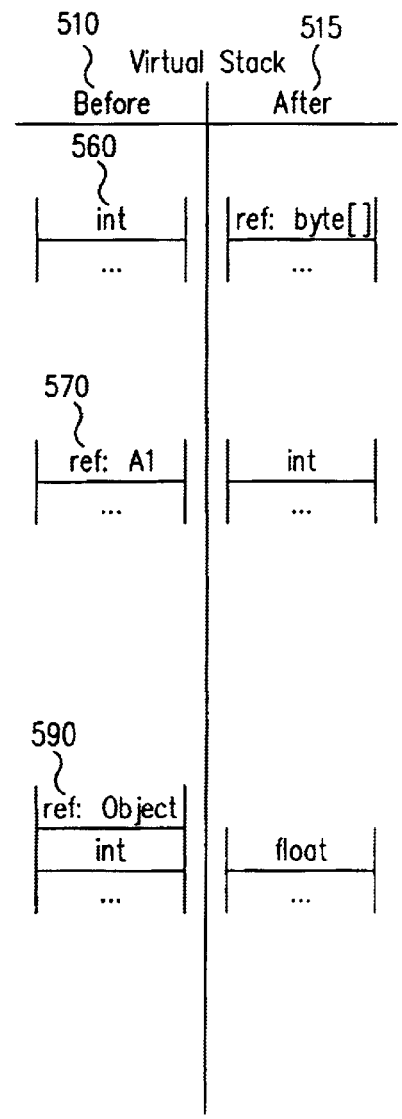
FIG. 10B is a code sample that illustrates verification that follows an execution path.
Figure 10C:
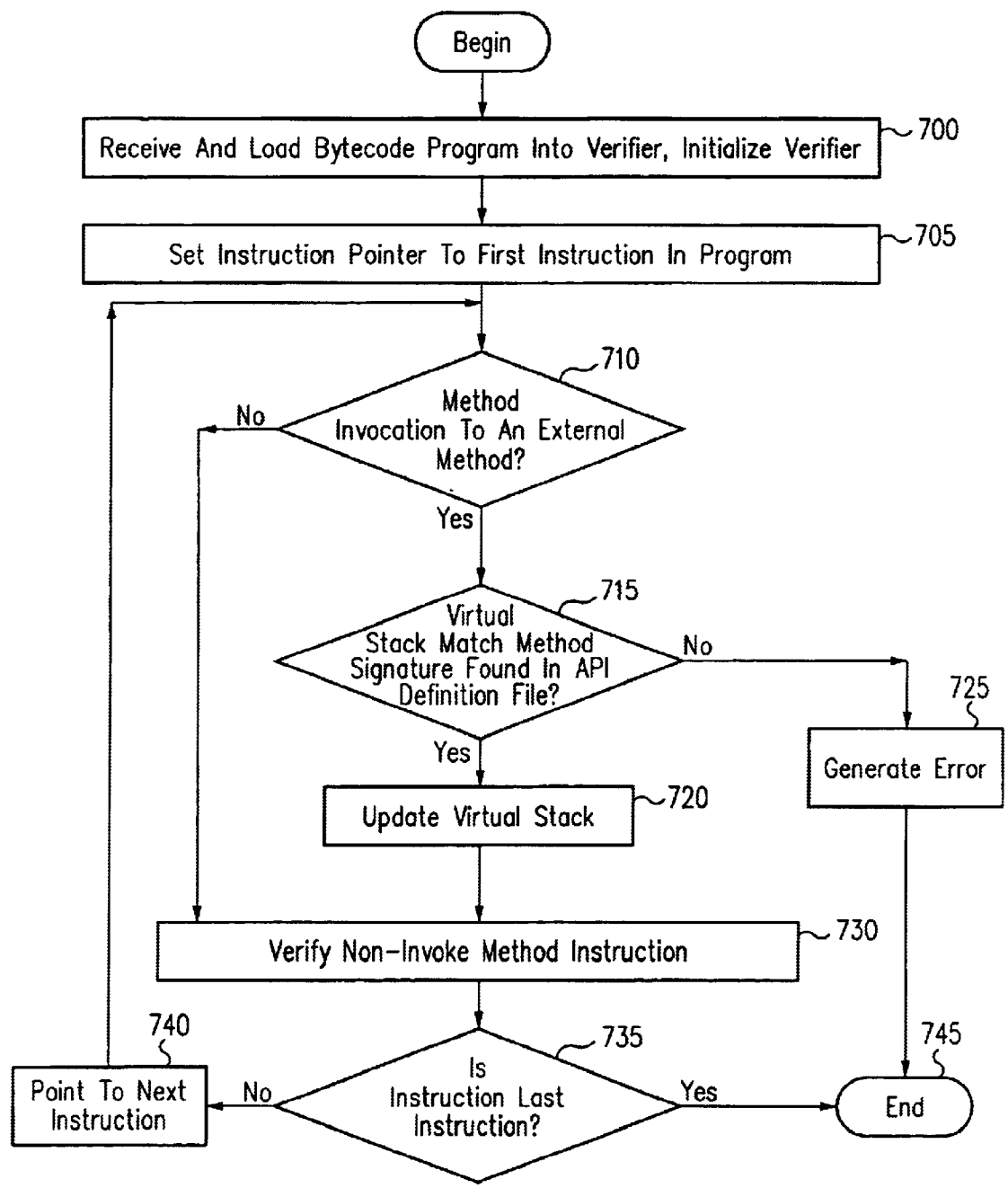
FIG. 10C is a flow diagram that illustrates verification that follows an execution path to an API in accordance with one embodiment of the present invention.

FIGS. 10A to 10D illustrate the two approaches for verification discussed above. FIGS. 10A and 10B illustrate typical verification methods that continue the verification process into an implementation that includes externally referenced items. FIGS. 10C and 10D illustrate verification that uses API definition files to verify a program unit that includes external references in accordance with the present invention.

The examples in FIGS. 10A and 10B illustrate analysis which is typically performed during verification using a virtual stack. The virtual stack is validated and updated during verification based on the operations defined for instructions in a method. (For examples of virtual stack usage during verification, See U.S. Pat. No. 5,668,999 to Gosling, U.S. Pat. No. 5,748,964 to Gosling and U.S. Pat. No. 5,740,441 to Yellin et al.)

Turning now to FIG. 10A, a flow diagram that illustrates verification that follows an execution path is presented. At 400, a bytecode program is loaded into a verifier and the verifier is initialized. At 405, the instruction pointer is set to the first instruction in the program. At 410, a determination is made regarding whether the instruction is a method invocation instruction. If the instruction is not a method invocation instruction, the instruction is verified at 435. If the instruction is a method invocation instruction, at 415, a determination is made regarding whether the current virtual stack matches the list of expected parameter and result types, also referred to as the method signature, found in the binary file that contains the referenced method. If there is no match, a verification error is indicated at 430. If there is a match, at 420, the invoked method is verified. At 425 a determination is made regarding whether the invoked method was successfully verified. If the invoked method was not successfully verified, a verification error is indicated at 430. At 440, a determination is made regarding whether the current instruction is the last instruction. If the current instruction is not the last instruction, verification continues with the next instruction at 445. Verification terminates at 450 when the last instruction has been examined.

With respect to reference numerals 415–425 of FIG. 10A, when a method invocation instruction is encountered during verification that is coupled with execution, a typical verifier performs the following operations pertaining to the content of the referencing binary file.

1. The calling context is verified to determine whether it has appropriate permission to reference the method found in the referenced binary file. For example, a protected method can only be invoked by a method in a subclass of or a member of the class in which the method is declared.
2. The arguments found on the virtual stack at the point of invocation in the referencing binary file are verified to determine whether they are appropriate given the declaration of the invoked method found in the referenced binary file.
3. The virtual stack is updated by removing the arguments to the invoked method and adding the return type, if any, of the invoked method. The return type is defined in the referenced binary file.
4. Verification of the referencing binary file continues at the instruction after the method invocation using the updated virtual stack.

Typically, either before step 1 or between steps 2 and 3, the referenced binary file is verified. Regardless of the exact timing, when verification is coupled with execution, a referenced binary file is verified before it is executed.

The example shown in FIG 10A does illustrate verification of references to non-methods such as classes, interfaces and fields. Typically, verification of such non-method preferences also entails examining the referenced items. Furthermore, when examining such referenced items, the referenced binary file that contains the referenced item is also typically verified.

Turning now to FIG. 10B, a code sample that illustrates verification that follows an execution path is presented. FIG. 10B includes code samples for a library package L0 500 and applet A1 505. Applet A1 505 includes references to items in package L0 500. FIG. 10A also illustrates a virtual stack before (510) and after (515) verification of method invocation instructions in L0 500 and A1 505. Method A10 520 references method A11 525 at reference numeral 530. Method A11 525 references method L01 535 at reference numeral 540. Method L01 535 references method L02 545 at reference numeral 550.

Verification of applet A1 505 begins with method A10 520. At 530, method A10 520 invokes method A11 525 with the short integer parameter S 555 and assigns the result to byte array ba 560. In preparation for the method A11 525 invocation, the method A11 525 parameter types are put on the stack. In Java™ technology, values of type byte, short and integer are represented as integer types on the stack. Thus, before invoking method A11 525, the virtual stack 560 contains type int, the type for S 555. This matches the declaration of method A11 525 found in the A1 binary file 505.

At 540, method A11 525 invokes method L01 535 and assigns the result to byte array type ba 565. Before invoking method L01 535, the virtual stack 570 contains a reference to class A1. The expected type is type Object 575. A1 570 is assignment-compatible with Object 575 because A1 570 extends Object (580). This matches the declaration of method L01 535 found in the L0 binary file 500.

At 575, method L01 535 invokes method L02 545 and assigns the result to float value f 585. Before invoking method L02 550, the virtual stack 590 contains a reference to class Object. The virtual stack 590 also contains an integer type corresponding to integer I 595. This matches the declaration of method L02 545 found in the L0 binary file 500.

Next, the virtual stack is updated by removing the arguments to the invoked method and adding the return type, if any, of the invoked method. The return type is defined in the referenced binary file. In the above example, method L02 545 returns float type f 600, which matches the method L02 return type of float f 605. Method L01 535 returns an integer type. At 565, the returned integer type is explicitly cast to type byte, which matches the type of ba[0] 610. Method A11 525 returns a byte array, which corresponds to the type of byte array ba 560.

Thus, method A10 520 has been verified by examining the content of method A10 520 and the binaries of all compilation units referenced by method A10 520.

Verification using an API definition file according to embodiments of the present invention follows the same four steps shown above with reference to FIG. 10A, except that information about the invoked method is obtained from an API definition file instead of a binary file. The conclusions drawn regarding verification of the referencing binary file are the same in both cases. In addition, at some point during verification, the API definition file is verified for internal consistency. This step is parallel to verifying a referenced binary file. Furthermore, during verification using an API definition file according to embodiments of the present invention, the assumption is made that an implementation of the API definition file has been verified in a previous operation and that the implementation is complaint with the API definition file. This is described in more detail with reference to FIGS. 10C and 10D.

Turning now to FIG. 10C, a flow diagram that illustrates verification that follows an execution path to an API definition file in accordance with one embodiment of the present invention is presented. At 700, a verifier receives a bytecode program and the verifier is initialized. At 705, the instruction pointer is set to the first instruction in the program. At 710, a determination is made regarding whether the current instruction is a method invocation to an external method. If the current instruction is not a method invocation to an external method, the instruction is verified at 730. If the instruction is a method invocation instruction, at 715, a determination is made regarding whether the virtual stack matches the method signature found in an API definition file that corresponds to the binary file of the invoked method. If the virtual stack does not match the method signature, a verification error is indicated at 725. If the virtual stack matches the method signature, the virtual stack is updated at 720. At 735, a determination is made regarding whether the current instruction is the last instruction. If there is another instruction, the next instruction is pointed to at 740 and verification continues at 710. Verification ends at 745 when the last instruction has been examined. A detailed example that illustrates this process is described with reference to FIG. 10D.

Turning now to FIG. 10D, a code sample that illustrates verification that follows an execution path to an API in accordance with one embodiment of the present invention is presented. FIG. 10D includes code samples for a library package L0 800 and applet A1 805. Applet A1 805 includes references to items in package L0 800. FIG. 10D also illustrates a virtual stack before (810) and after (815) execution of source code statements in L0 800 and A1 805. Method A10 820 references method A11 825 at reference numeral 830. Method A11 825 references method L01 835 at reference numeral 840.

Verification of applet A1 805 begins with method A10 820. At 830, method A10 820 invokes method A11 825 with the short integer parameter S 845 and assigns the result to byte array ba 850. In preparation for the method A11 invocation (830), the method A11 825 parameter types are put on the stack 850. As mentioned above, in Java™ technology, values of type byte, short and integer are represented as integer types on the stack. Thus, before invoking method A11 825, the virtual stack 850 contains type int, the type for S 845. This matches the declaration of method A11 825 found in the A1 binary file 805.

At 840, method A11 825 invokes method L01 835 and assigns the result to byte array type ba 855. Before invoking method L01 835, the virtual stack 860 contains a reference to class A1. The expected type is type Object 865. A1 860 is assignment-compaitable with Object 865 because A1 860 extends Object (870). This matches the declaration of method L01 835 found in the L0 API definition file 800.

Next, the virtual stack is updated by removing the arguments to the invoked method and adding the return type, if any, of the invoked method. The return type is defined in the referenced API definition file. In the above example, method L01 875 returns an integer type. At 855, the returned integer type is explicitly cast to type byte, which matches the type of ba[0] 880. Method A11 825 returns a byte array, which corresponds to the type of byte array ba 850.

Thus, method A10 820 has been verified without reference to the binary files containing compilation units referenced by method A10 820. Instead, method A10 820 has been verified by examining the content of method A10 820 and the API definition files of all compilation units referenced by method A10 820.

The description regarding verification in FIGS. 10C and 10D illustrated verification with respect to a method. This example is intended for illustrative purposes only. Those of ordinary skill in the art will recognize that verification of other references may be performed in a similar manner using an API definition file. These references include by way of example, references to fields, classes and interfaces.

Figure 11A:
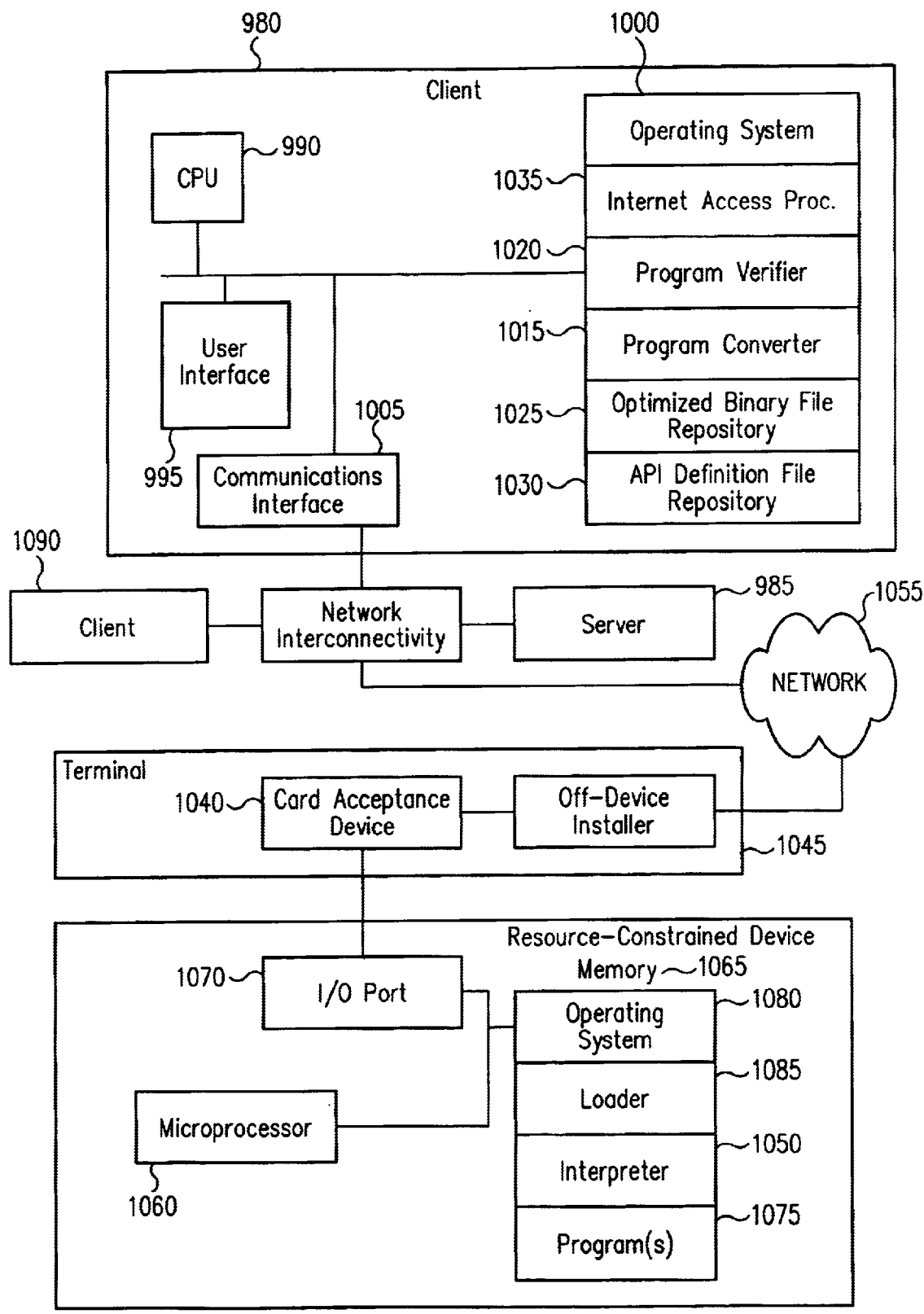
FIG. 11A is a block diagram that illustrates one embodiment of the present invention.

Referring now to FIG. 11A, there is shown a distributed computer system having multiple client computers 980, 1090 and multiple server computers 985. In one embodiment, each client computer 980, 1090 is connected to the servers 985 via the Internet 1055, although other types of communication connections could be used. While most client computers are desktop computers, such as Sun workstations, IBM compatible computers and Macintosh computers, virtually any type of computer can be a client computer. In one embodiment, each client computer includes a CPU 990, a user interface 995, a memory 1000, Internet access processor 1035 and a communications interface 1005. Client memory 1000 stores:

an operating system 1010;

a program converter 1015, which converts binary file and related API definition files into optimized binary files and API definition files;

a program verifier 1020 for verifying whether or not a specified program satisfies certain predefined integrity criteria;

at least one optimized binary file repository 1025, for locally storing optimized binary files in use and/or available for use by users of the computer 1000;

at least one API definition file repository 1030 for storing export files.

The converter 1015 converts a binary file into an optimized binary file and an API definition file of the optimized binary file. If the binary file includes external reference, the converter 1015 uses the API definition file stored in 1030 of the module including the external reference to verify the external reference.

According to one embodiment of the present invention, the resource-constrained device is a Java Card™ enabled device. In this embodiment, the API definition file is Java Card™ export file, the binary file is a class file and the optimized binary file is a CAP file. Also, the methods in a class to be loaded are bytecode programs, which when interpreted will result in a series of executable instructions. According to this embodiment, the bytecode program verifier 1020 verifies the integrity of the bytecode programs in a CAP file with reference to the CAP file, the export file corresponding to the CAP file, and the export file containing externally referenced items. If all the methods are successfully verified, the CAP file is sent to the resource-constrained device 1040 via a terminal device 1045.

As shown in FIG. 11A, a terminal 1045 is equipped with a card acceptance device (CAD) 1050 for receiving a card. The terminal 1045 may be connected to a network 1055 that communicates with a plurality of other computing devices, such as a server 985. It is possible to load data and software onto a smart card over the network 1055 using card equipped devices. Downloads of this nature include applets or libraries to be loaded onto a smart card as well as digital cash and other information used in accordance with a variety of electronic commerce and other applications. The verified instructions and data used to control processing elements of the card acceptance device and of the smart card may be stored in volatile or non-volatile memory or may be received directly over a communications link e.g., as a carrier wave containing the instructions and/or data. Further, for example, the network 1055 can be a LAN or WAN such as the Internet or other network.

The third computer node 1040, assumed here to be configured as smart card or other resource-constrained device, includes a microprocessor 1060, a memory 1065, and an I/O port 1070 that connects the second computer node to the terminal device 1045. Resource-constrained device memory 1065 stores programs for execution by the processor 1060.

Resource-constrained device memory 1065 stores:

an operating system 1080;

a loader 1085 for loading a verified optimized binary file via 110 port 1070;

an interpreter 1050 for executing a module within an optimized binary file;

at least one program 1075 for execution by microprocessor 1060.

The first, second and third computer nodes 980, 1045 and 1040 may utilize different computer platforms and operating systems 1010, 1080 such that object code program executed on either one of the two computer nodes cannot be executed on the other. For instance, the server node 985 might be a Sun Microsystems computer using a nix operating system while the user workstation node 980 may be an IBM compatible computer system using a Pentium III microprocessor and a Windows 98 operating system. Furthermore, other user workstations coupled to the same network and utilizing the same server 985 might use a variety of operating systems.

According to embodiments of the present invention, verification is performed before the module is loaded on a resource-constrained device, herein referred as remote verification. According to one embodiment of the present invention, verification is performed on a resource-rich device such as a desktop PC, as illustrated in FIG. 11A. According to another embodiment of the present invention, remote verification is performed on a terminal device, as illustrated in FIG. 11B.

Figure 11B:
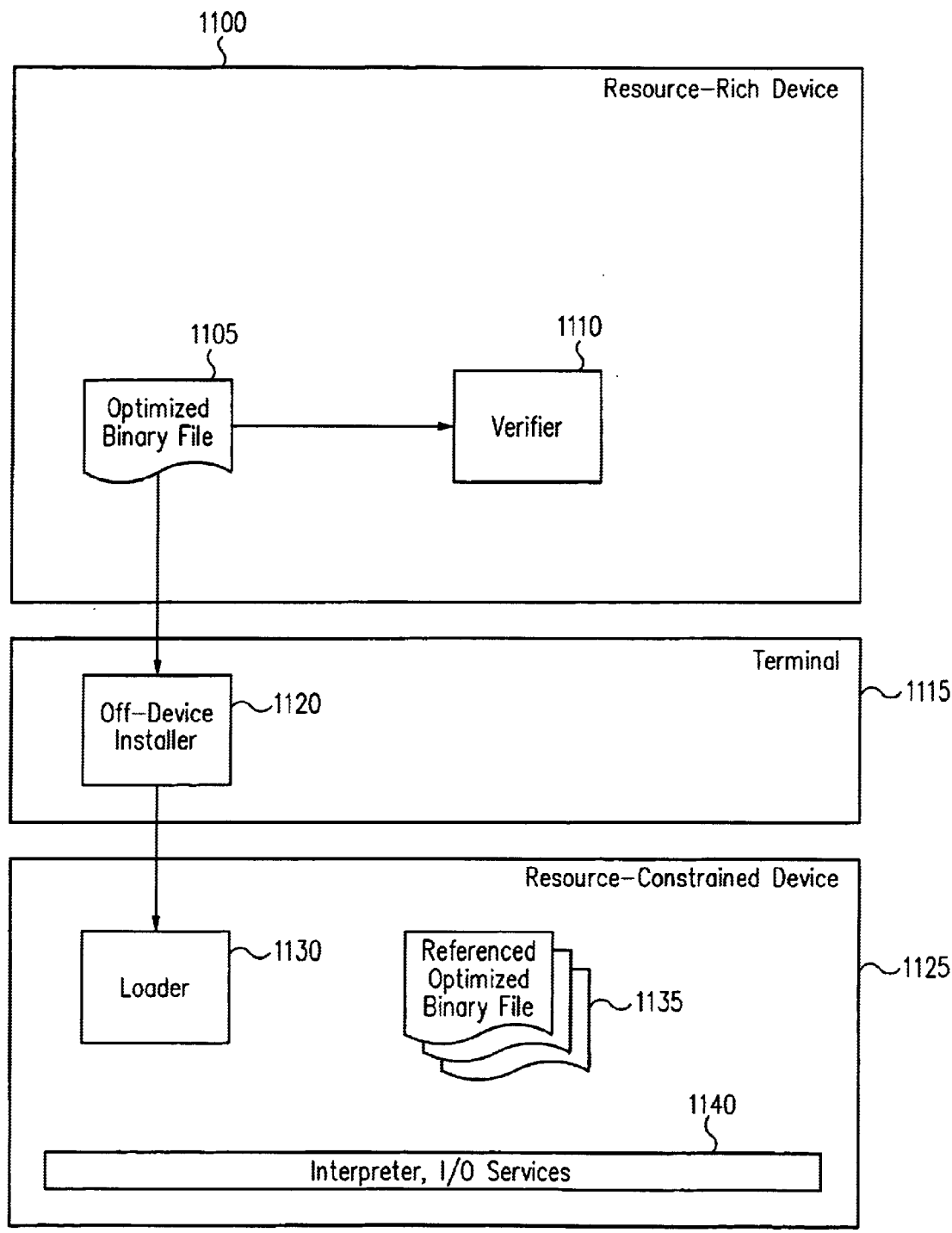
FIG. 11B is a block diagram that illustrates verification on a resource rich device in accordance with one embodiment of the present invention.

Turning now to FIG. 11B, a block diagram that illustrates verification on a resource-rich device before installation in accordance with one embodiment of the present invention is presented. A verifier 1110 resident on the resource-rich device 1100 verifies the optimized binary file 1105. The optimized binary file 1105 is transferred to a terminal device 1115 having an installer 1120. The installer 1120 communicates with a loader 1130 on a resource-constrained device 1125 to load the verified optimized binary file.

According to one embodiment of the present invention the loader confirms that the context in which the binary file will be linked and executed is compatible with the context of the API definition files used during verification. Additionally, the context of a verified and loaded binary file must not be allowed to change in to an incompatible state. In a Java Card™ compliant system, this requirement is fulfilled by ensuring that a referenced binary file is never deleted or updated.

Figure 11C:
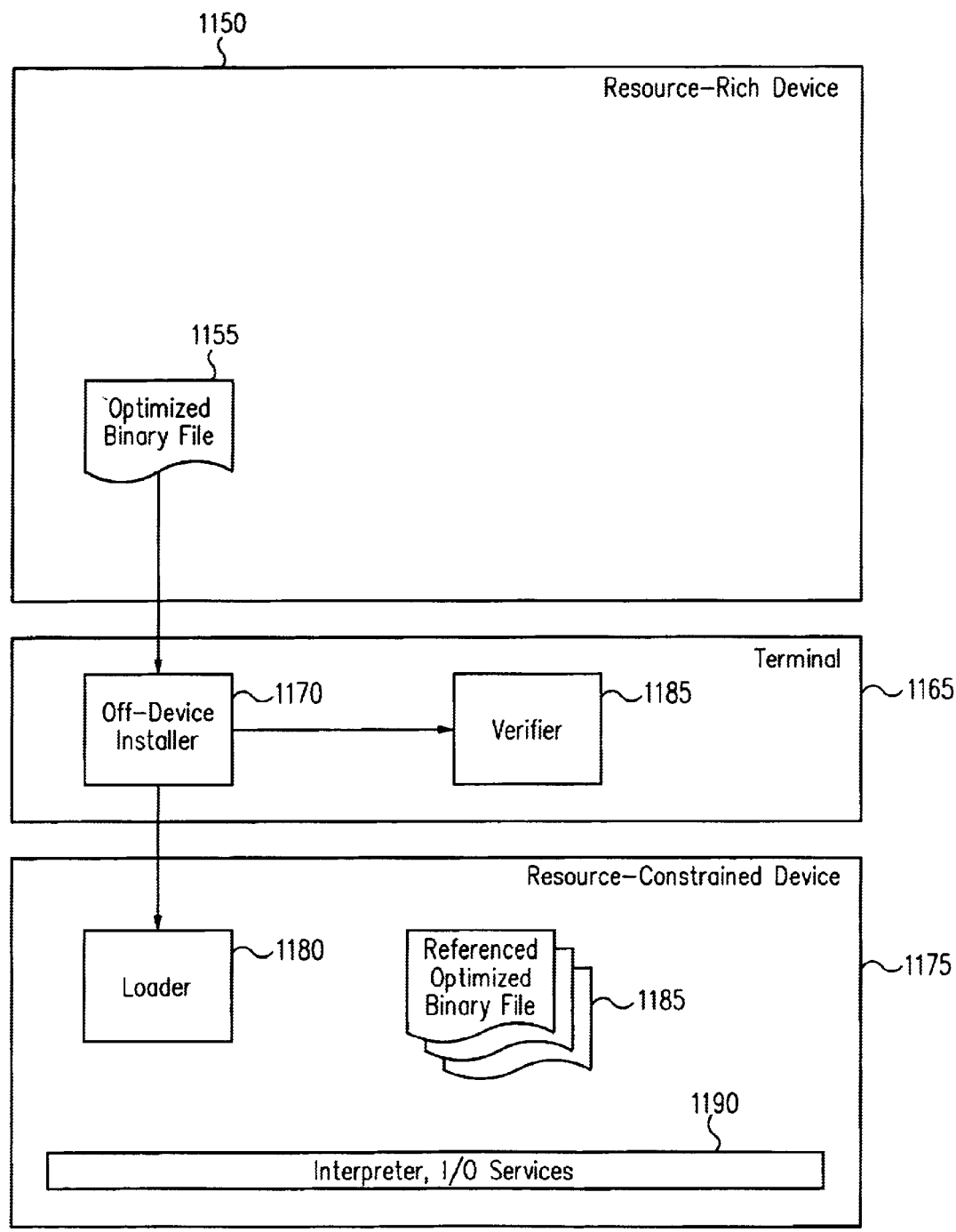
FIG. 11C is a block diagram that illustrates verification on a terminal device in accordance with one embodiment of the present invention.

Turning now to FIG. 11C, a block diagram that illustrates verification on a terminal device before installation in accordance with one embodiment of the present invention is presented. The optimized binary file 1155 is transferred to a terminal device 1165 having an off-device installer 1170. A verifier 1160 resident on the terminal device 1165 verifies the optimized binary file 1155. The installer 1170 communicates with a loader 1180 on a resource-constrained device 1175 to load the verified optimized binary file.

Figure 12:
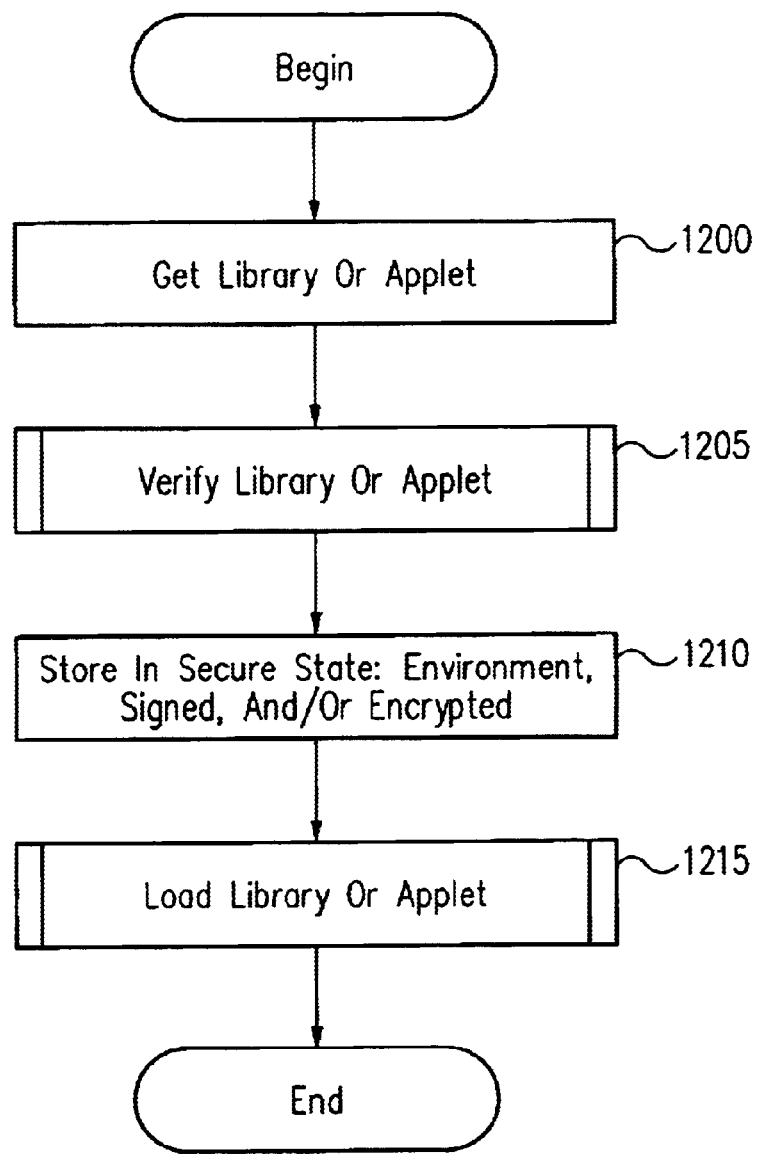
FIG. 12 is a high level flow diagram that illustrates a verification method in accordance with one embodiment of the present invention.

Turning now to FIG. 12, a flow diagram that illustrates verification in accordance with one embodiment of the present invention is presented. At 1200, a library or applet is received. At 1205, the library or applet is verified using the applet binary file, the API definition file of the library or applet if it exports items, and the API definition file of any binary files containing items referenced by the applet binary file. At 1210, the library or applet is stored in a secure state to protect against unauthorized modification. At 1215, the library or applet is loaded for subsequent linking and execution on a resource-constrained device.

Figure 13A:
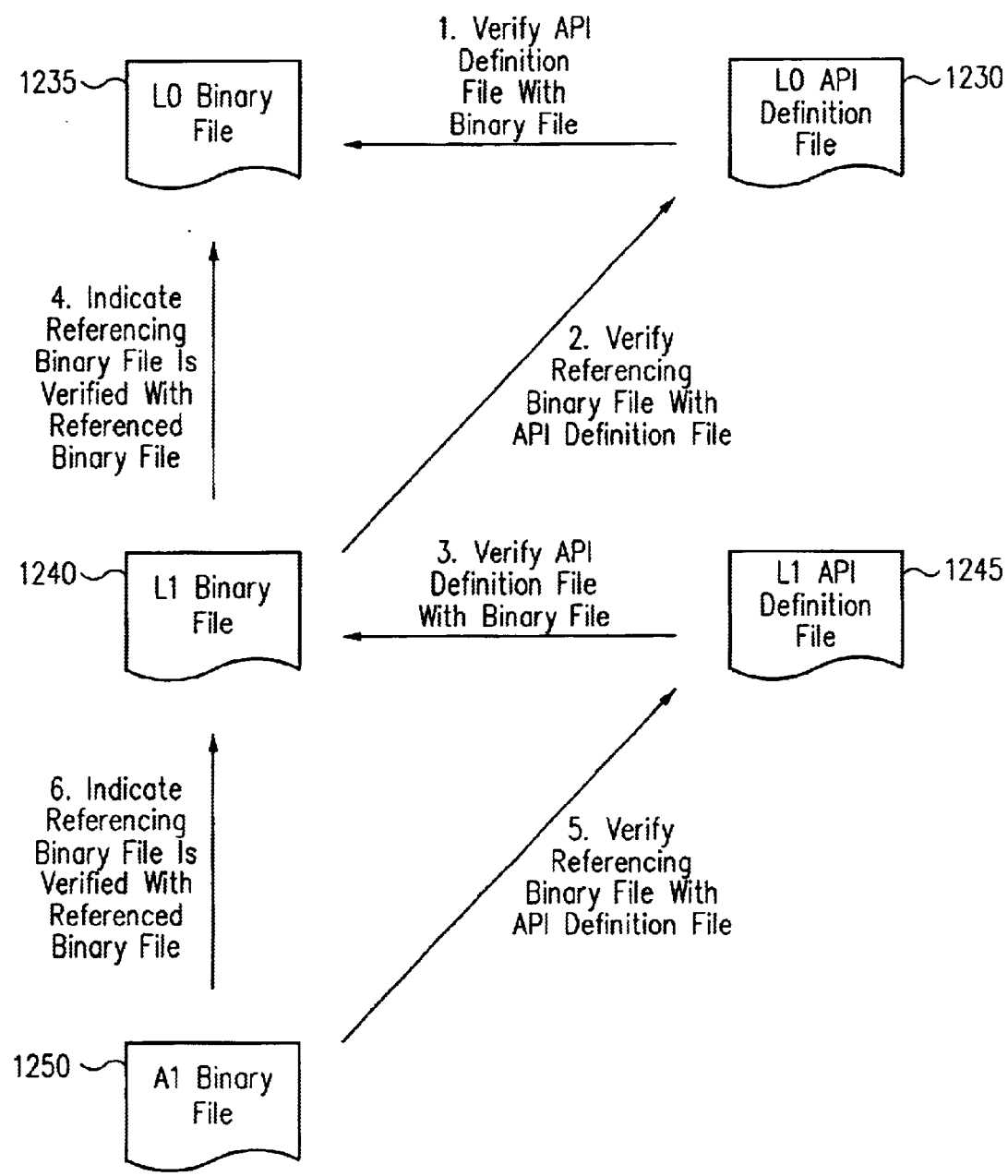
FIG. 13A is a block diagram that illustrates verification relationships using Application Programming Interface (API) definitions in accordance with one embodiment of the present invention.

Turning now to FIG. 13A, a block diagram that illustrates verification relationships using Application Programming Interface (API) definitions in accordance with one embodiment of the present invention is presented. FIG. 13A illustrates the process of verifying applet A1. In this example, A1 is an applet that references the library L1. Library L1 includes a reference to Library L0. Verification proceeds as follows: First, the L0 API definition file 1230 is verified with the L0 binary file 1235. Next, the L1 binary file 1240 is verified with the L0 API definition file 1230. Next, the L1 API definition file 1245 is verified with the L1 binary file 1240. Verification of the L1 binary file 1240 with the L0 API definition file 1230 thus indicates the L1 binary file 1240 is verified with the L0 binary file 1235. Next, the A1 binary file 1250 is verified with the L1 API definition file 1245. Verification of the A1 binary file 1250 with the L1 API definition file 1245 thus indicates the A1 binary file 1250 is verified with the L1 binary file 1240. Thus, a fully verified collection of binary files (A1 1250, L1 1245 and L0 1230) has been constructed.

As mentioned previously, an API specifies how one program module may interact with another. Different vendors may implement an API in different ways, as long as they adhere to the API definition file. For example, one vendor may choose to implement a method that sorts a set of values using an algorithm optimized for speed, while another vendor may choose to implement an algorithm optimized for low memory usage. In both cases, the implementations would be compliant with an API definition file containing a method that performs a sort, and vary in implementation details.

According to embodiments of the present invention, verification does not depend upon a particular implementation. More specifically, if a referencing binary file references an API and there is more than one implementation for that API, the referencing binary file is said to be verified with each implementation if the referencing binary file verifies with the referenced API and if each implementation of the API verifies with the referenced API definition file. This example is illustrated in FIG. 13B.

Figure 13B:
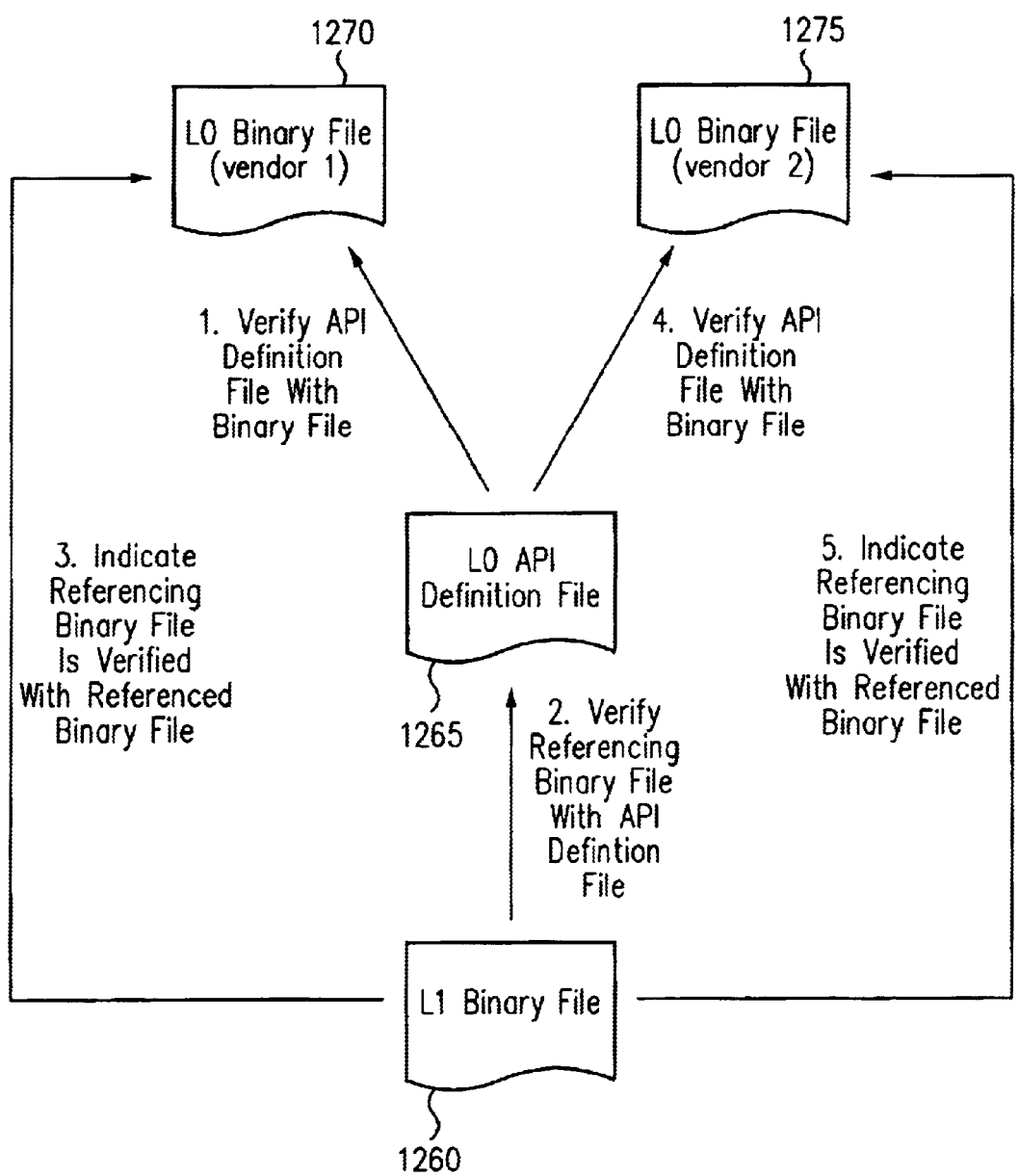
FIG. 13B is a block diagram that illustrates implementation-independent verification using an API definition file with multiple implementations in accordance with one embodiment of the present invention.

Turning now to FIG. 13B, a block diagram that illustrates implementation-independent verification using an API definition file with multiple implementations in accordance with one embodiment of the present invention is presented. In the example, L1 is a library that references library L0. Library L0 has two implementations from two different vendors, vendor 1 implemented 1270 and vendor 2 implemented 1275. Both the L0 binary file from vendor 1 (1270) and the L0 binary file from vendor 2 (1275) are verified with the L0 API definition file 1265. Next, the L1 binary file 1260 is verified with the L0 API definition file 1265. Since both L0 binary files 1270 and 1275 are verified against the L0 API definition file 1265 and since the L1 binary file 1260 is verified against the L0 API definition file 1265, the L1 binary file 1260 is verified against both particular implementations of L0, that is binary files 1270 and 1275. Thus, two fully verified collections of binary files have been constructed: 1) L1 binary file 1260 and L0 binary file provided by vendor 1 (1270); and 2) L1 binary file and L0 binary file provided by vendor 2 (1275).

As shown in FIG. 13B, verification applies to all permutations of linking. Thus, when binary file L1 (1260) is installed on one resource-constrained device, it may be linked with the L0 binary file from vendor 1 (1270). It may also be installed on another resource-constrained device and linked with the L0 binary file from vendor 2 (1275).

The number of implementations illustrated in FIG. 13B is not intended to be limiting in any way. Those of ordinary skill in the art will recognize that the invention is applicable when more that two implementations are provided.

Figure 14:
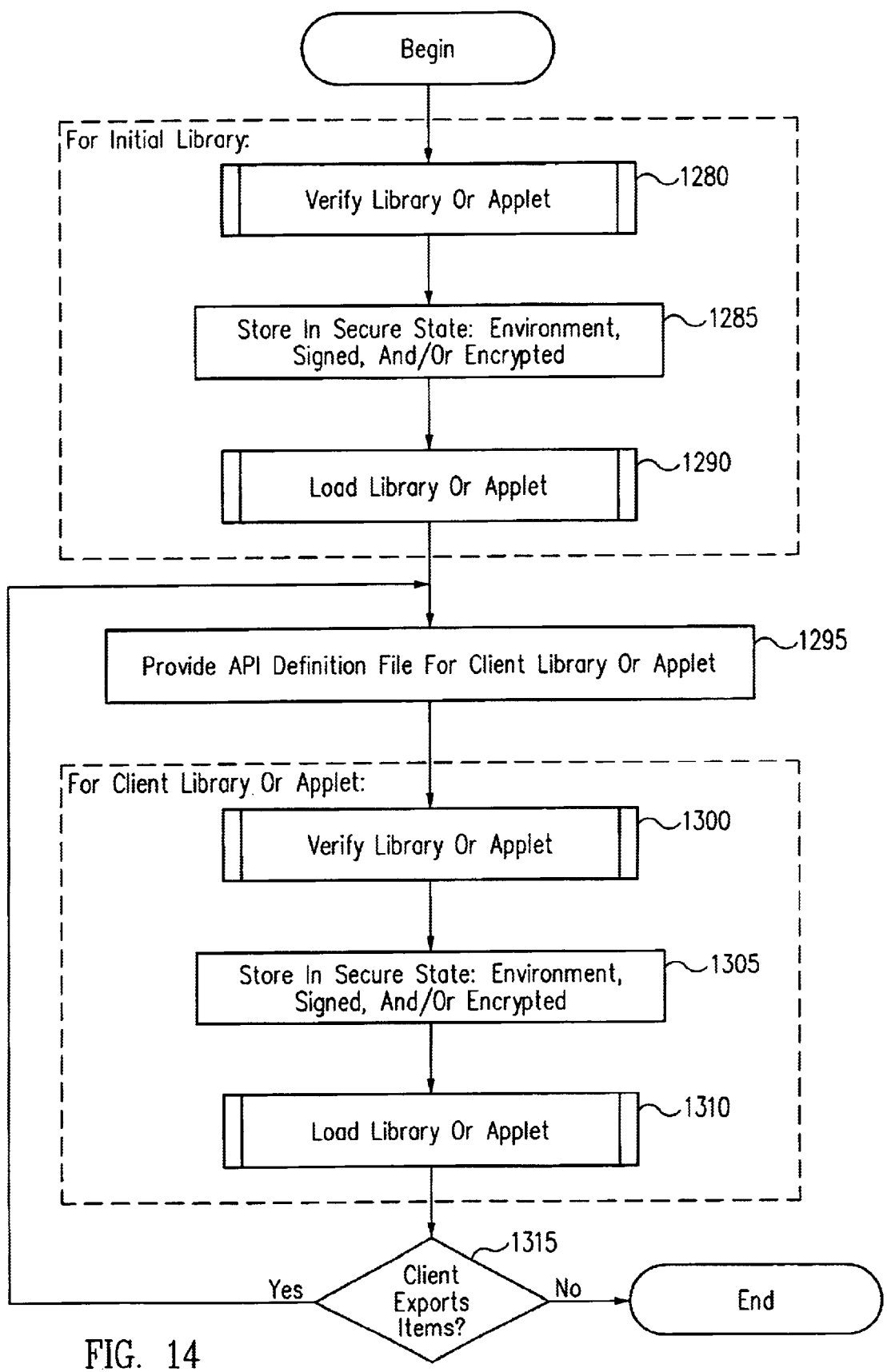
FIG. 14 is a flow diagram that illustrates incrementally constructing a verified system in accordance with one embodiment of the present invention.

According to one embodiment of the present invention, program verification is performed iteratively, one program module at a time. This is also called distributed verification. Referring to FIG. 14, a flow diagram that illustrates incrementally constructing a verified system in accordance with one embodiment of the present invention is presented. An initial library is verified (1280), stored in a secure state (1285) and loaded (1290). At 1295, the API definition file of the initial verified library is provided for use by client libraries or applets that reference library. Each client library or applet is verified (1300), stored in a secure state (1305) and loaded (1310). At 1315, a check is made to determine whether the client exports any items. If the client exports any items, the API definition file of the client library is provided for use by other libraries or applets that reference the client library (1295).

According to another embodiment of the present invention, the loading of verified libraries and applets is delayed until all the libraries and applets required for an update have been verified. In both this case and the embodiment described immediately above, the process of performing verification using API definition files is the same.

Figure 15A:
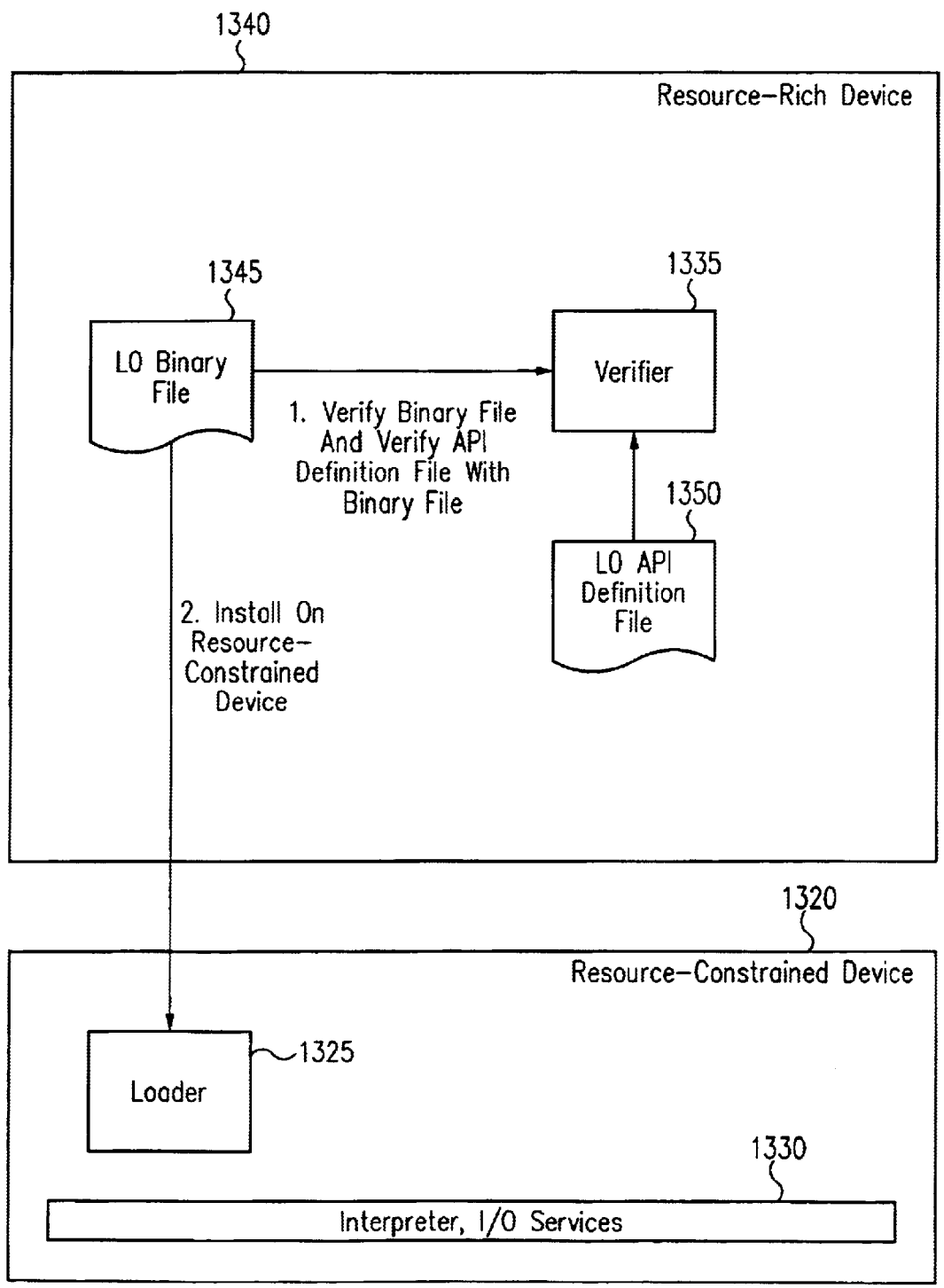
FIG. 15A is a block diagram that illustrates verification and installation of an initial library in accordance with one embodiment of the present invention.

Turning now to FIG. 15A, a block diagram that illustrates verification and installation of an initial library in accordance with one embodiment of the present invention is presented. In this example, the resource-constrained device 1320 contains a loader 1325, an interpreter and I/O services 1330. No libraries or applets have been installed at this point. This initial content provides the foundation for installing and executing libraries and applets. First, a verifier 1335 on a resource-rich device 1340 verifies the L0 binary file 1345, the library to be added. The resource-rich device may be by way of example, a desktop PC or a terminal device. Verification of the L0 binary file 1345 includes verifying the L0 binary file 1345 and verifying the L0 API definition file 1350 with the L0 binary file 1345. Next, the verified L0 binary file 1345 is installed on a resource-constrained device 1320. After installation, the content of the resource-constrained device 1320 is said to be verified.

Figure 15B:
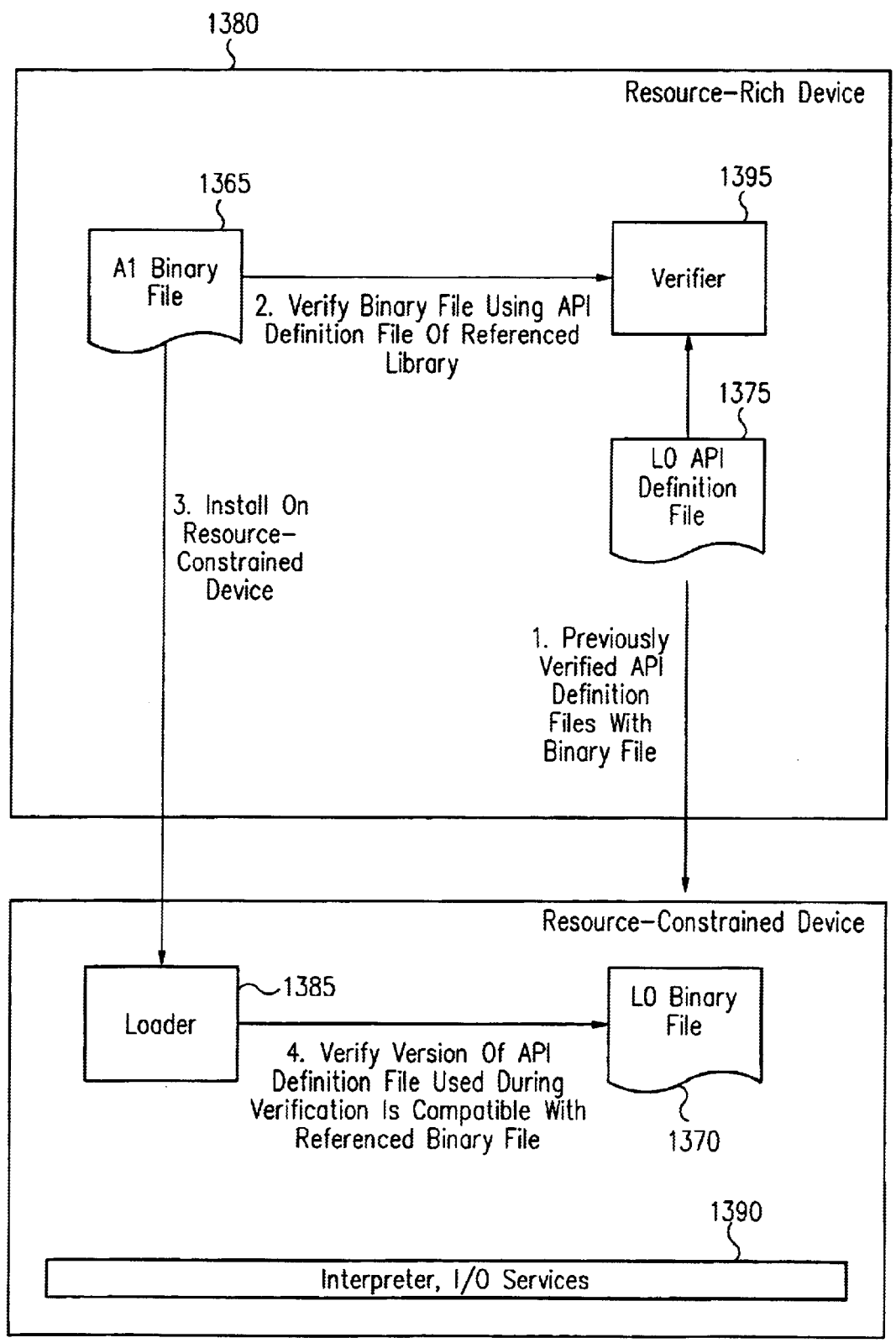
FIG. 15B is a block diagram that illustrates verification and installation of an applet that references a library in accordance with one embodiment of the present invention.

Turning now to FIG. 15B, a block diagram that illustrates verification and installation of an applet that references a library in accordance with one embodiment of the present invention is presented. In this example, resource-constrained device 1360 has been initialized with library L0 (see FIG. 15A) and applet A1 is to be added to the resource-constrained device 1360. Applet A1 binary file 1365 references library L0. Since the L0 binary file 1370 has already been verified with its corresponding L0 API definition file 1375 and installed, the verified API definition file for L0 1375 is resident on the resource-rich device 1380. The A1 binary file 1365 is verified using the API definition file of the referenced library, L0 1375. After verification, the A1 binary file 1365 is installed on the resource-constrained device. After installation, the content of the resource-constrained device (A1 binary file 1365 and L0 binary file 1370) is said to be verified.

Figure 16:
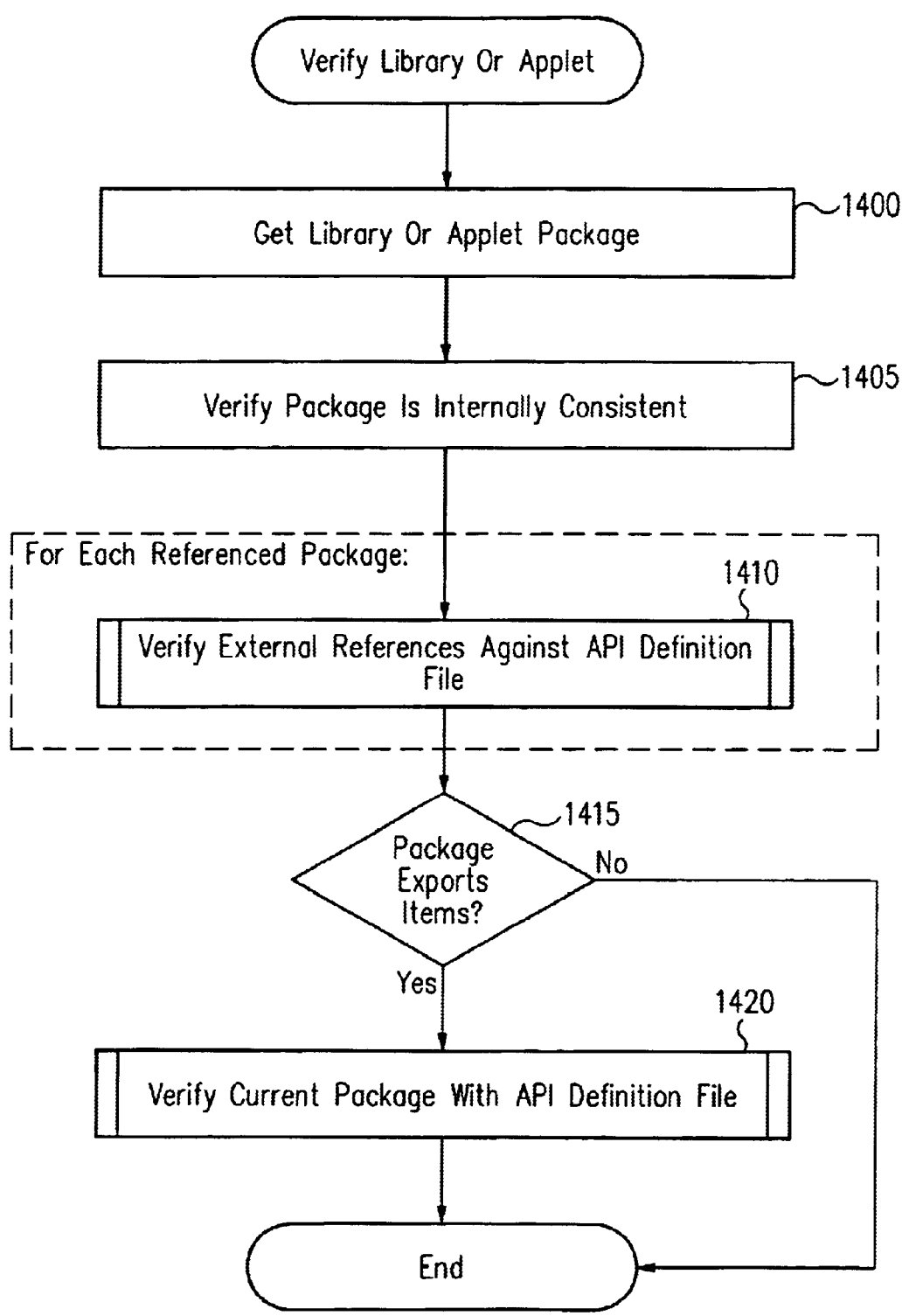
FIG. 16 is a flow diagram that illustrates verifying a library or applet in accordance with one embodiment of the present invention.

Those of ordinary skill in the art will recognize that the scenarios illustrated in FIGS. 15A and 15B can be combined to verify and install a module that both references a library and exports an API. The module's exported API definition file will be available to be referenced by succeeding binary files. Turning now to FIG. 16, a flow diagram that illustrates verifying a library or applet in accordance with one embodiment of the present invention is presented. At 1400, a library or applet package is received. At 1405, intra-module checks are performed to determine whether the package is internally consistent. At 1410, inter-module checks are performed to determine whether the external references of the package are consistent within the context of the API definition file of each external reference. At 1415, a check is made to determine whether the package exports any items. If the package exports items, the current package is verified against its API definition file (1420).

The order of the intra-module checks and the inter-module checks shown in FIG. 16 is not intended to indicate a required order of operations. During program verification that follows an execution path, those of ordinary skill in the art will recognize that when intra-module checks or inter-module checks are performed can depend on the context of the element being verified. When performing intra-module checks, if an element is encountered that references an external item, an inter-module check can be performed immediately. Alternatively, all inter-module checks can be postponed and performed in one step as shown in FIG. 16.

The intra-module checks may include by way of example, verifying binary file format and verifying that:

a class is not a subclass of a "final" class, no method in the class overrides a "final" method in a superclass, each class, other than "Object" has a superclass, class reference, field reference and method reference in the constant pool has a legal name, class and type signature.

See, for example, U.S. Pat. No. 5,668,999 to Gosling, U.S. Pat. No. 5,748,964 to Gosling and U.S. Pat. No. 5,740,441 to Yellin et al.

Figure 17:
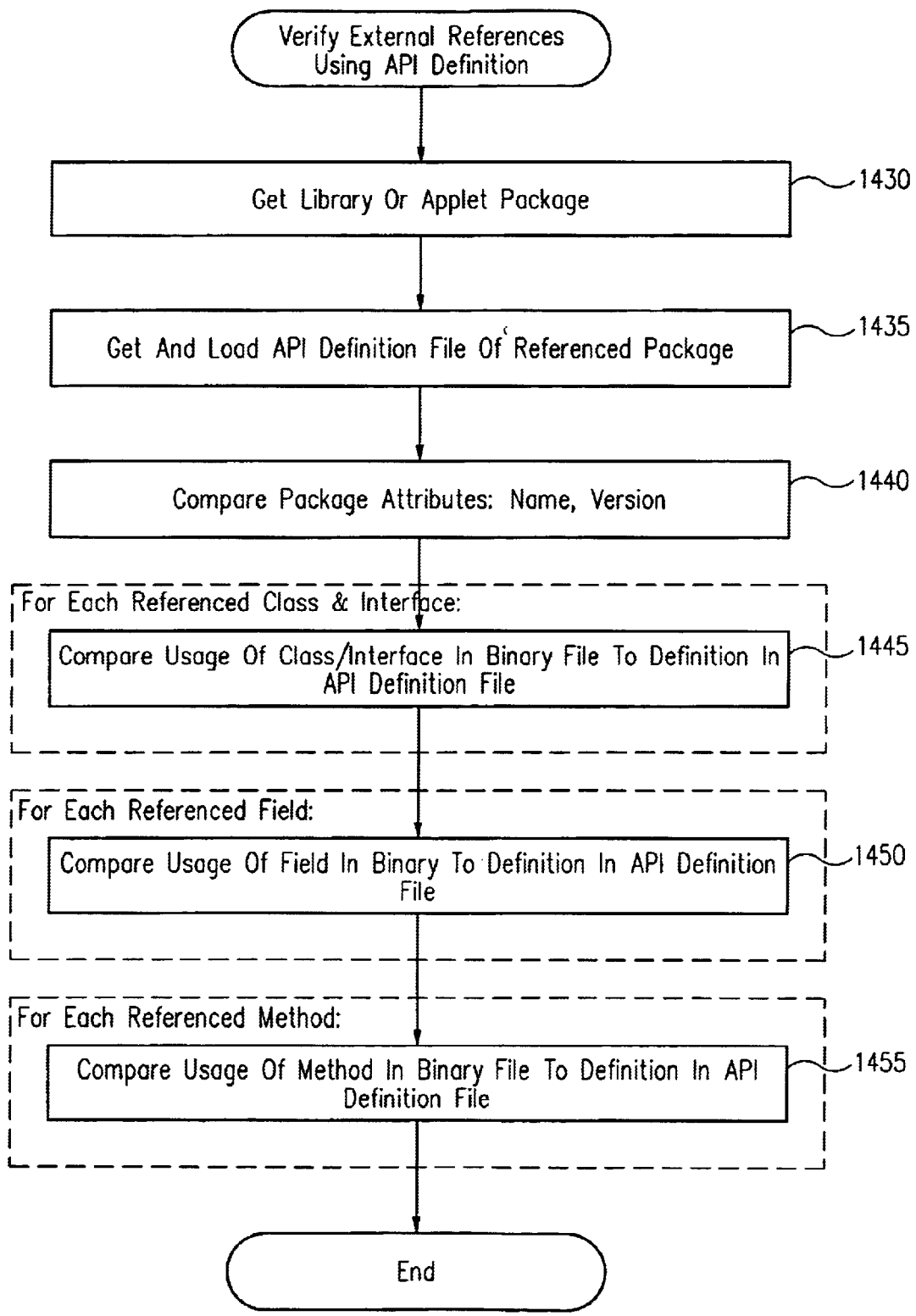
FIG. 17 is a flow diagram that illustrates verifying external references using an API definition file in accordance with one embodiment of the present invention.

Turning now to FIG. 17, a flow diagram that illustrates verifying external references using an API definition file in accordance with one embodiment of the present invention is presented. FIG. 17 provides more detail for reference numeral 1410 in FIG. 16. At 1430, a program unit such as a library or applet package is received. If the API definition file of the referenced package is not found, a verification error is indicated. At 1435, the API definition file of the referenced package is loaded. At 1440, the package attributes are compared. The package attributes may include by way of example, the package name and version. If the package attributes are not compatible, a verification error is indicated.

At 1445, for each referenced class and interface, the usage of the class or interface in the binary file is compared to the corresponding usage in the API definition file. If the class or interface is not found in the API definition file, a verification error is indicated. If usage of the class or interface is not compatible, a verification error is indicated. An example of an incompatibility is an attempt to create an instance of an abstract class or interface.

At 1450, for each referenced field, the field is located in the API definition file, and the usage of the field in the binary file is compared to the corresponding definition in the API. If the field is not found in the API definition file, a verification error is indicated. If the usage of the field is not compatible, a verification error is indicated. An example of an incompatibility is an attempt to store a floating-point value into a field that is declared as an integer (int)-type in the API definition file.

At 1455, for each referenced method, the method is located in the API definition file, and the usage of the method in the binary file is compared to the definition in the API. If the method is not found in the API definition file, a verification error is indicated. If the usage of the method is not compatible, a verification error is indicated. An example of an incompatibility is an attempt to invoke a method without passing in any parameters when the method is declared in the API definition file to require one parameter of the specified type (int).

Those of ordinary skill in the art will recognize that locating and verifying usage against definitions in an API definition file can be performed sequentially in one step as shown in FIG. 16. Alternatively, locating and verifying usage against definition can be performed as the usage is encountered.

Figure 18:
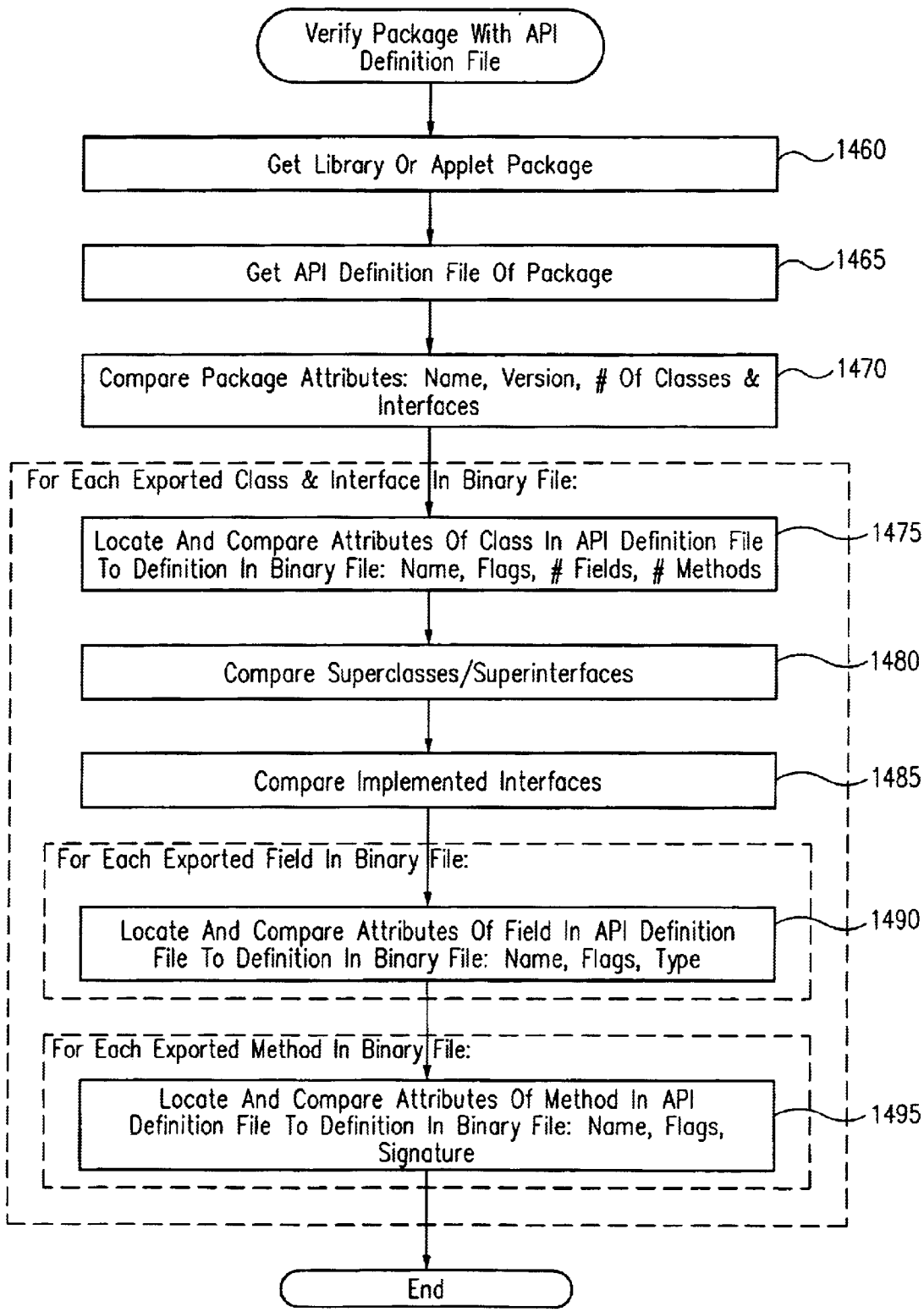
FIG. 18 is a flow diagram that illustrates verifying a package with its corresponding API definition file in accordance with one embodiment of the present invention.

Turning now to FIG. 18, a flow diagram that illustrates verifying a package with its corresponding API definition file in accordance with one embodiment of the present invention is presented. FIG. 18 provides more detail for reference numeral 1420 in FIG. 16. FIG. 18 is not intended to indicate the order in which the various checks are performed. A library or applet package (herein referred to as a binary file) is received (1460) and the API definition file of the package is received (1465). If the API definition file of the package is not found, and the binary file exports elements, a verification error is indicated.

At 1470, the package attributes are compared. The attributes may include by way of example, the package name, version and number of classes and interfaces. Continuing this example, this step detects whether an extra class or interface is defined in the API definition file that is not present in the binary file. If the attributes are incompatible, a verification error is indicated.

Several checks are performed to verify each exported class and interface in the binary file. At 1475, the class or interface is located in the API definition file and the attributes of the class or interface as defined in the API definition file are compared to the definition of the class or interface in the binary file. If the class or interface is not found in the API definition file, a verification error is indicated. The attributes may include by way of example, the class name, flags, number of fields and number of methods. Continuing this example, this step detects whether an extra field or method is defined in the API definition file that is not present in the binary file. Additionally, this step will detect whether an extra field or method is present in the binary file but not defined in the API definition file. If the attributes are incompatible, an error is indicated.

At 1480, the superclasses and superinterfaces are compared. See, for example, U.S. Provisional Patent Application filed Nov. 12, 1999 in the name of inventor Judith E. Schwabe, entitled "API Representation Enabling Submerged Hierarchy", Ser. No. 60/165,298 and U.S. Provisional Patent Application filed Nov. 15, 1999 in the name of inventor Judith E. Schwabe, entitled "API Representation Enabling Submerged Hierarchy", Ser. No. 60/165,533. If the set of public superclasses or superinterfaces of a class or interfaces, respectively, defined in the binary file do not correspond to the set in the API definition file, a verification error is indicated.

At 1485, the set of public implemented interfaces of a class in the binary file is compared to the set in the API definition file. If the sets of implemented interfaces do not correspond, a verification error is indicated.

At 1490, for each exported field in the binary file, the field is located in the API definition file and the attributes of the field in the API definition file are compared to the definition in the binary file. If the field is not located, a verification error is indicated. The attributes may include by way of example, the name, flags and type. If the attributes are incompatible, a verification error is indicated.

At 1495, for each exported method in the binary file, the method is located in the API definition file and the attributes of the method in the API definition file are compared to the definition in the binary file. If the method is not found in the API definition file, a verification error is indicated. The attributes may include by way of example, the name, flags and signature. If the attributes are incompatible, a verification error is indicated.

Figure 19:
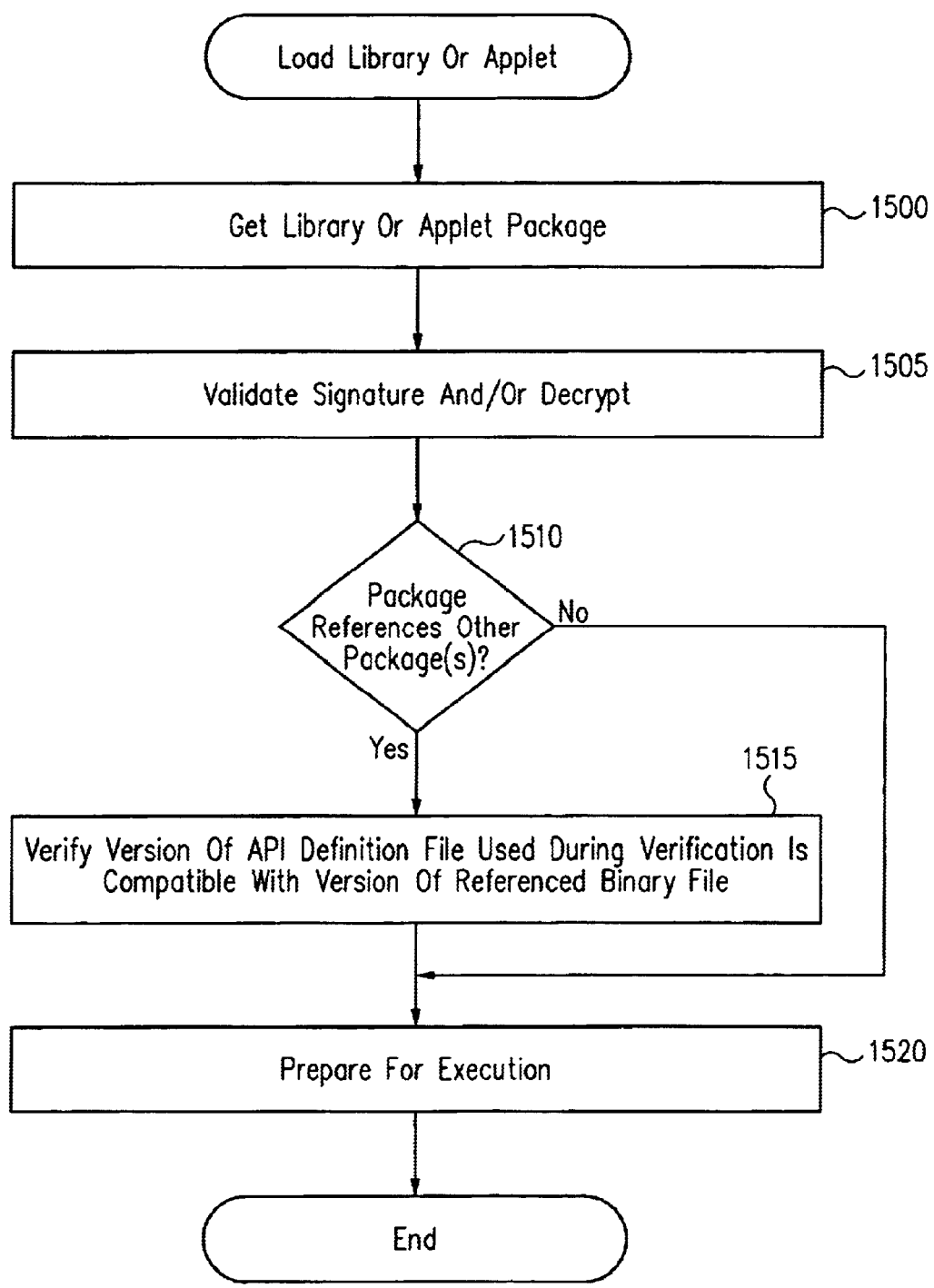
FIG. 19 is a flow diagram that illustrates loading a library or applet onto a resource-constrained device in accordance with one embodiment of the present invention.

Turning now to FIG. 19, a flow diagram that illustrates loading a library or applet onto a resource-constrained device in accordance with one embodiment of the present invention is presented. At 1500, a program unit such as a library or applet package is received. At 1505, the program unit is authenticated. At 1510, a determination is made regarding whether the program unit references one or more other program units. If the program unit references one or more other program units, at 1515, the version of the API definition file used during verification is checked to determine whether it is compatible with the version of the referenced binary file resident on the resource-constrained device. If the versions are not compatible, an error is indicated. At 1520, the program unit is loaded or otherwise prepared for execution when the version of the API definition file used during verification is compatible with the version of the referenced binary resident on the resource-constrained device.

The invention as described thus far has pertained to scenarios where the version of a referenced binary file is the same version as its corresponding API definition file. As to discussed previously, both the Java™ specification and the Java Card™ specification define behavior where the version of a referenced binary file is a newer version than the one used during preparation of the referencing binary file. Furthermore, these specifications define changes that can be made when revising a binary file that result in the new version being backward compatible with the previous version. When a newer version is backward compatible with an older version it is said to be binary compatible.

Binary compatible changes to a referenced binary file are undetectable to a referencing binary file. The updated referenced binary file is required to contain all of the elements of the API definition file of the original binary file. Accordingly, a referencing binary file is provided with a superset of the element in original API of the referenced binary file, and therefore all of the elements it references are guaranteed to be present. A referencing binary file may be successfully linked with, verified with and executed with any binary compatible revision of the original target referenced binary file. Thus, it is valid in both Java™ and Java Card™ technology to prepare a binary file using an old version of a referenced binary file and then later link, verify and execute with a new, binary compatible version of the referenced binary file.

According to one embodiment of the present invention, an additional verification step is performed on a resource-rich device to confirm whether or not a revision of a binary file is binary (backward) compatible with an earlier version. This additional step provides the functionality required to assert that a referencing binary file and a binary compatible revision of a referenced binary file constitute a verified set. The details of this verification step are described in FIGS. 20A through 20D.

Those of ordinary skill in the art will recognize that other versioning schemes can also be used to provide binary compatibility information as well.

Figure 20A:
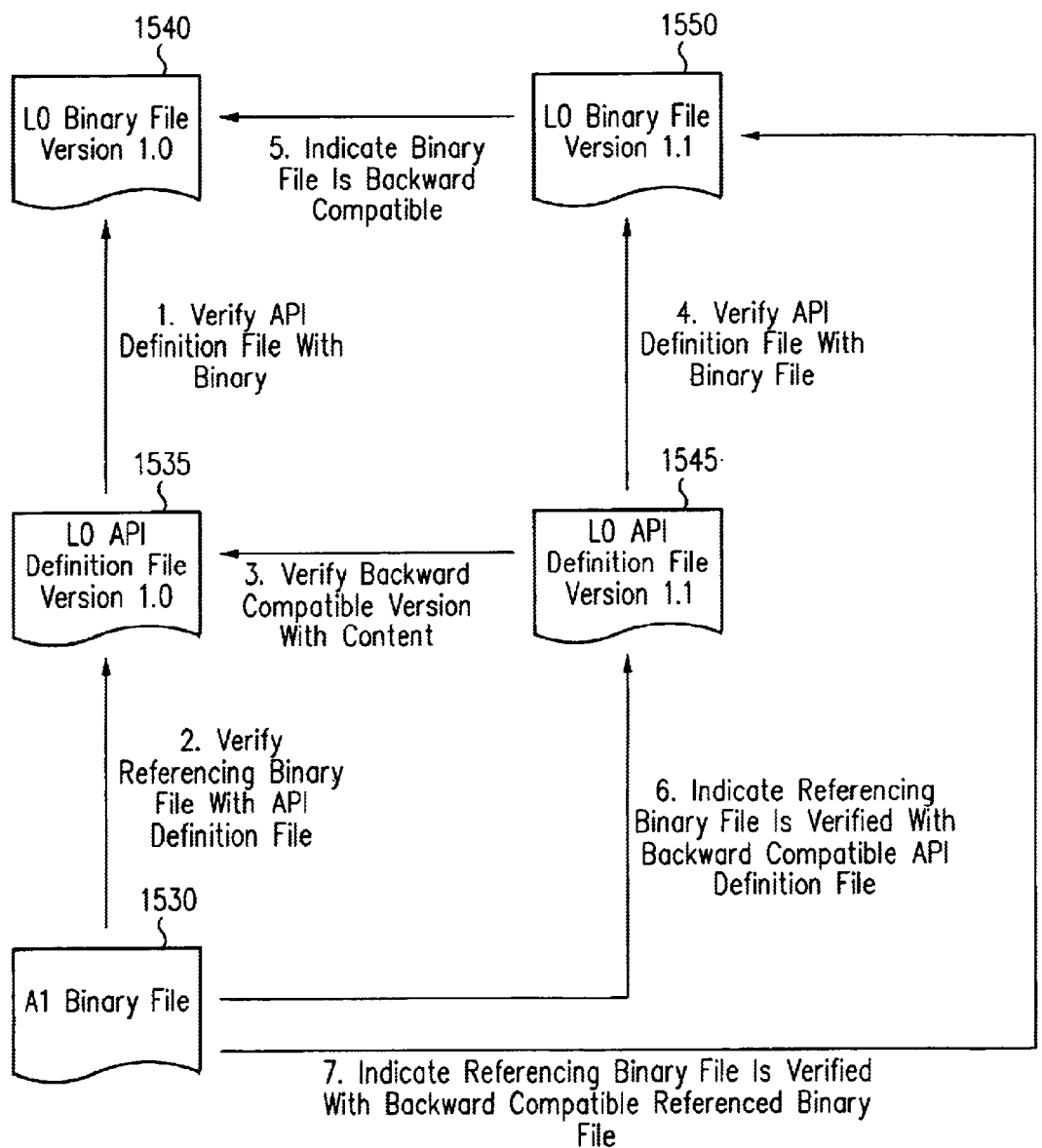
FIG. 20A is a block diagram that illustrates verification using API definition files of backward compatible revisions in accordance with one embodiment of the present invention.

Turning now to FIG. 20A, a block diagram that illustrates verification using API definition files of backward compatible revisions in accordance with one embodiment of the present invention is presented. The example illustrated in FIG. 20A includes an applet A1 that references library L0. Library L0 has two versions, 1.0 and 1.1. Each version of library L0 has been previously converted to a binary file and an API definition file. The A1 binary file 1530 was initially verified against L0 version 1.0. The precondition for this verification is verifying the L0 API definition file version 1.0 (1535) with the L0 binary file version 1.0 (1540). As described in FIG. 13A, these verification steps indicate that A1 binary file (1530) is verified with L0 binary file version 1.0 (1540).

Library L0 version 1.0 was subsequently changed to create L0 version 1.1. According to one embodiment of the present invention verification of the A1 binary file (1530) with the L0 version 1.1 binary file (1550) is established by verifying that L0 API definition file version 1.1 (1545) is backward compatible with L0 API definition file version 1.0 (1535) and by verifying that L0 API definition file version 1.1 (1545) verifies with L0 binary file version 1.1 (1550). Hence, a modified referenced library does not require verification of a referencing applet with the API definition file of the modified referenced library when it can be shown that the API definition file of the modified referenced library is backward compatible with the original referenced library and when the API definition file of the modified referenced library verifies with the binary file of the modified referenced library.

The verification steps shown in FIG. 20A indicate that A1 binary file (1530) is verified with L0 binary file version 1.1 (1540).

Figure 20B:
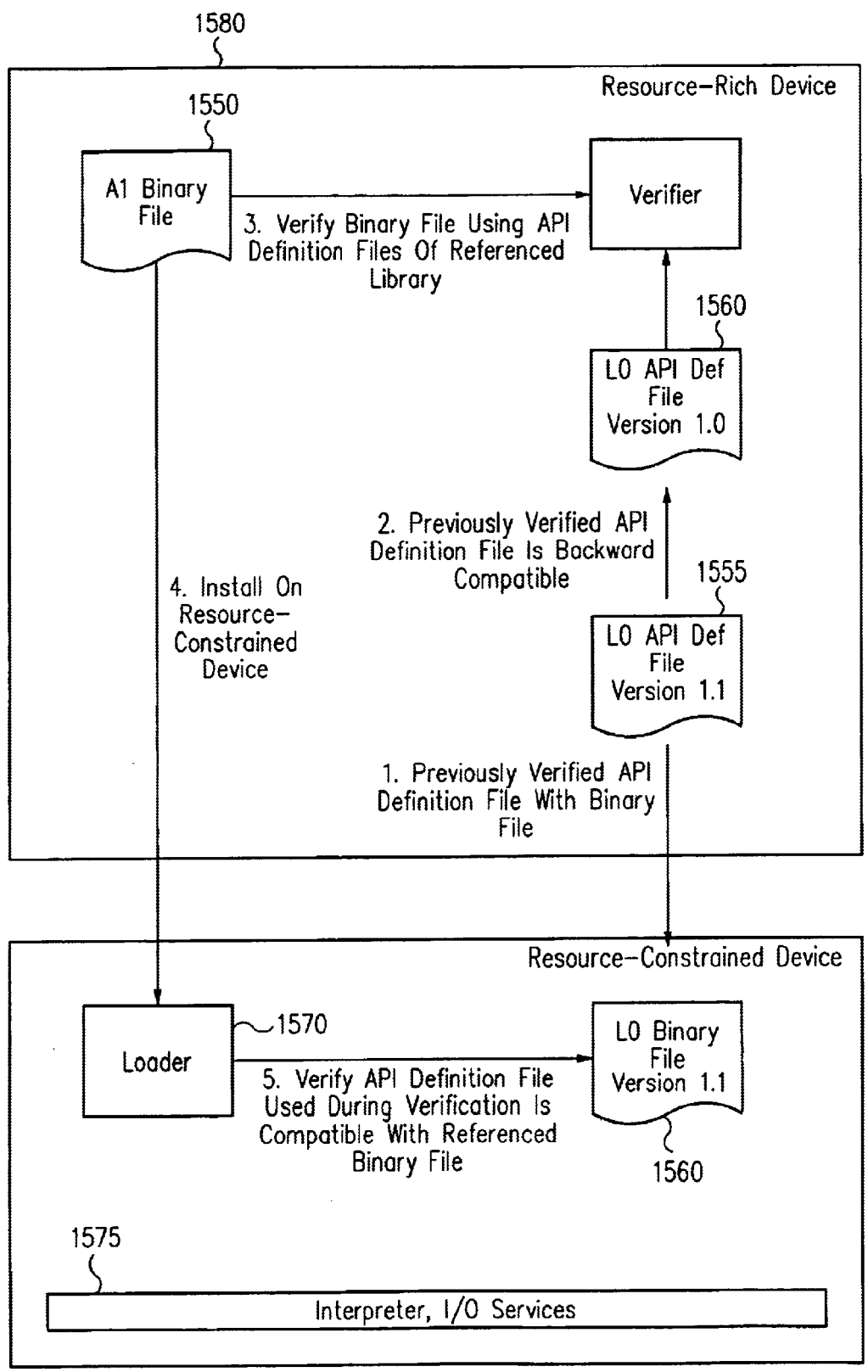
FIG. 20B is a block diagram that illustrates verification using API definition files of backward compatible revisions in accordance with one embodiment of the present invention.

Turning now to FIG. 20B, a block diagram that illustrates verification using API definition files of backward compatible revisions in accordance with one embodiment of the present invention is presented. FIG. 20B illustrates the case where a binary compatible version of a library has been previously installed on a resource-constrained device. The referencing binary file, A1 (1550), is prepared and verified using an earlier version of the referenced API definition file. The L0 binary file version 1.1 (1560) was previously verified with the L0 API definition file version 1.1 (1555). Next, the previously verified API (L0 API definition file version 1.1 (1555)) is verified to be backward compatible with the earlier version (L0 API definition file version 1.0 (1560))). Next, the A1 binary file (1550) is verified using the API definition files of the referenced library (L0 API definition file version 1.0 (1560)) and the A1 binary file (1550) is installed on the resource-constrained device 1565. A loader 1570 on the resource-constrained device 1565 verifies that the API definition file used during verification is compatible with the referenced binary file. The resulting content of the resource-constrained device 1565 is a verified set of binary files: A1 binary file (1550) and L0 binary file version 1.1 (1560).

Figure 20C:
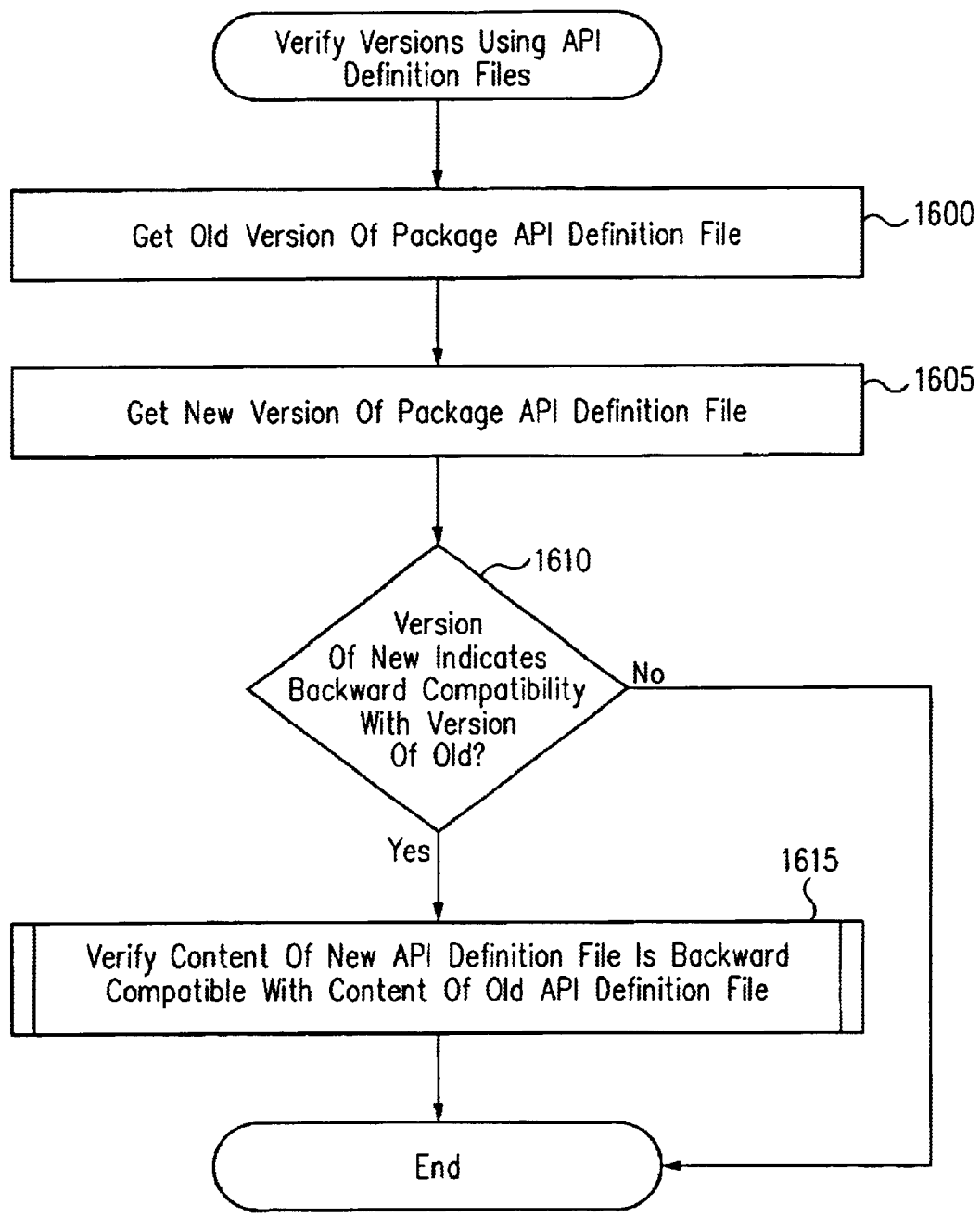
FIG. 20C is a flow diagram that illustrates verifying versions using API definition files in accordance with one embodiment of the present invention.

Turning now to FIG. 20C, a flow diagram that illustrates verifying versions using API definition files in accordance with one embodiment of the present invention is presented. At 1600, the old version of the package API definition file is received. At 1605, the new version of the package API definition file is received. At 1610, a determination is made regarding whether the version of the new package indicates backward compatibility with the version of the old package. In Java Card™ technology, for example, this determination is made by comparing major and minor version numbers. If the new version is backward compatible, at 1615, the content of the new API definition file is verified for backward compatibility with the content of the old API definition file.

Figure 20D:
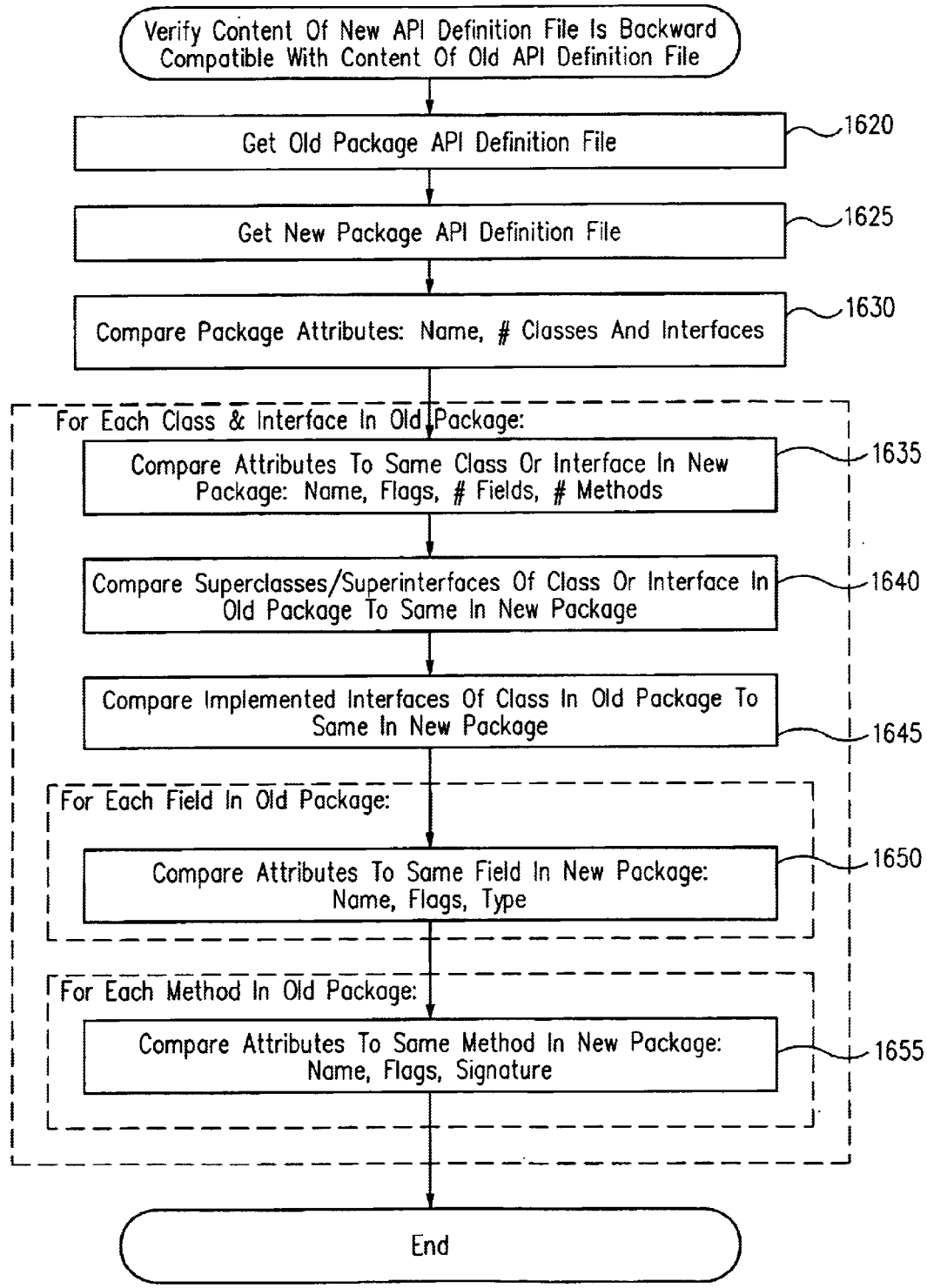
FIG. 20D is a flow diagram that illustrates verifying that the content of a new API definition file is backward compatible with the content of an old API definition file in accordance with one embodiment of the present invention.

Turning now to FIG. 20D, a flow diagram that illustrates verifying that the content of a new API definition file is backward compatible with the content of an old API definition file in accordance with one embodiment of the present invention is presented. At 1620 and 1625, the old package API definition file and the new API package definition are received.

At 1630, the package attributes are compared. The attributes may include the package name and the number of classes and interfaces. If the set of classes and interfaces defined in the old API definition file is not found in the new API definition file, a verification error is indicated.

Several checks are performed for each class and interface in the old package. At the class and interface attributes are compared to the attributes of the same class or interface in the new package. The attributes may include the name, flags, number of fields and number of methods. If the sets of fields and methods defined in a class or interface in the old API definition file are not found in the corresponding class or interface in the new API definition file, a verification error is indicated. If any other the attributes of a class or interface are not binary compatible, a verification error is indicated.

At 1640, the superclasses and superinterfaces of the class or interface are compared to the same in the new package. If the sets of superclasses or superinterfaces of a class or interface, respectively, are not binary compatible, a verification error is indicated.

At 1645, the implemented interfaces of a class are compared to the same in the new package. If the sets of implemented interfaces of a class are not binary compatible, a verification error is indicated.

At 1650, for each field in the old package, the attributes are compared to the same field in the new package. The attributes may include the name, flags and type. If the attributes of a field are not binary compatible, a verification error is indicated.

At 1655, for each method in the old package, the attributes are compared to the same method in the new package. The attributes may include the name, flags and signature. If the attributes of a method are not binary compatible, a verification error is indicated.

The list of binary compatibility checks performed is not intended to be an exhaustive list. Further details regarding binary compatibility may be found in the Java™ Language Specification and the Java Card™ Virtual Machine Specification.

According to embodiments of the present invention, program modules are verified on a resource-rich device prior to an installation on a resource-constrained device such as a smart card. FIGS. 21A to 21D illustrate different embodiments in which verification is performed.

Figure 21A:
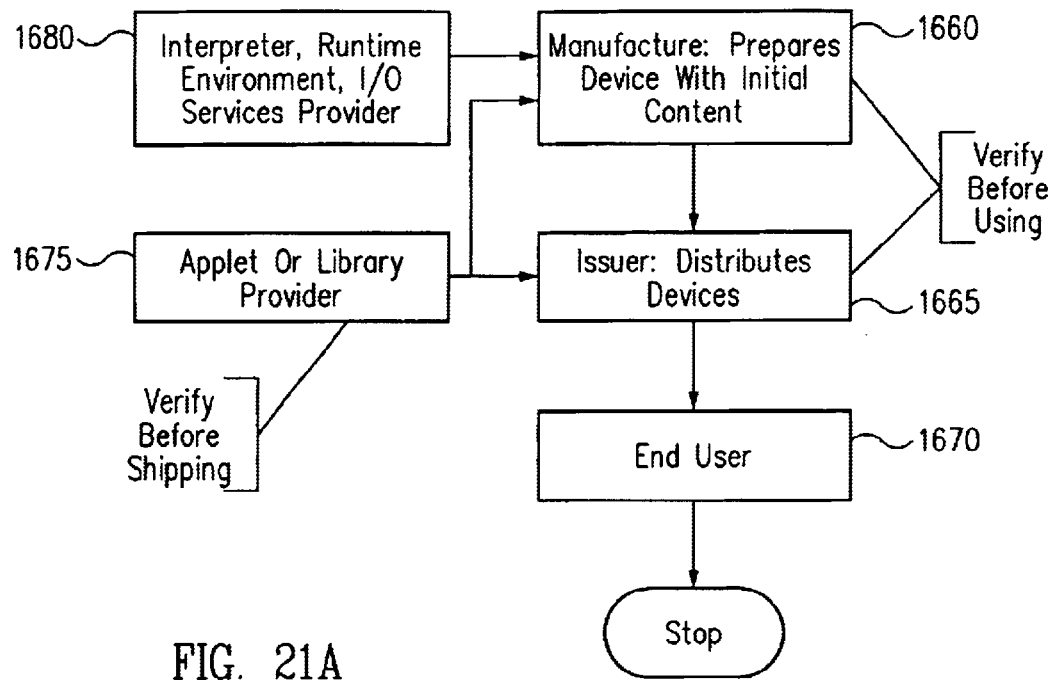
FIG. 21A is a block diagram that illustrates verification without post-issuance installation in accordance with one embodiment of the present invention.

According to one embodiment of the present invention, program modules are optionally verified by a card manufacturer, a card issuer and an applet or library provider. Verification may performed by any combination of the above parties. Referring to FIG. 21A, a manufacturer ensures that the initial content is verified and prepares a device with that initial content (1660) before shipping the device to an issuer. The initial modules may be verified either by the manufacturer, the applet or library provider (1675), or both. The issuer receives the device from the manufacturer, optionally installs additional modules, disables further installations and distributes the device (1665) to an end user 1670. If additional modules are installed, the issuer ensures that they are verified before installation. The issuer, applet or library provider, or both may perform verification.

Figure 21B:
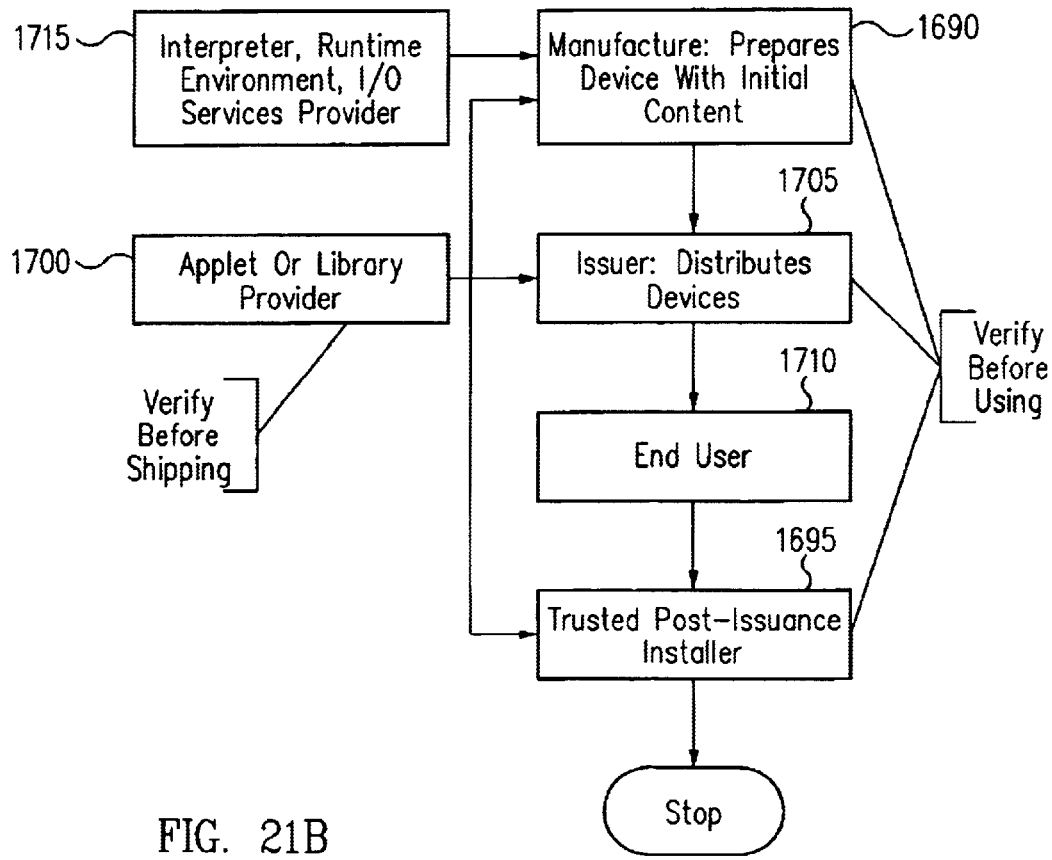
FIG. 21B is a block diagram that illustrates verification with trusted post-issuance installation in accordance with one embodiment of the present invention.

Turning now to FIG. 21B, according to another embodiment of the present invention, program modules are optionally verified by a card manufacturer (1690), a card issuer (1705), an applet provider (1700) and a trusted post-issuance installer (1695). Verification may be performed by any combination of the above parties, but must result in each module being verified before it is installed on a device. Referring to FIG. 21B, post-issuance installations by a trusted installer (1695) are allowed. Verification is optionally performed by the applet or library provider (1700) before shipping. Verification is also optionally performed by the manufacturer (1690), the issuer (1705) and the post-issuance installer (1695) before the additional content is installed on the device.

In FIG. 21B, the post-issuance installer is a trusted installer (1695). A trusted installer (1695) is an installer that has an agreement with the issuer, governing the post-issuance updates of cards. In contrast, an untrusted installer has no such agreement with the installer. When an issuer issues cards without disabling subsequent installations, an untrusted and possibly malevolent post-issuance installer could potentially add program modules to a card. Such unauthorized additions may corrupt the existing program modules or compromise them in other ways, causing the program to either execute erroneously or not execute at all.

Figure 21C:
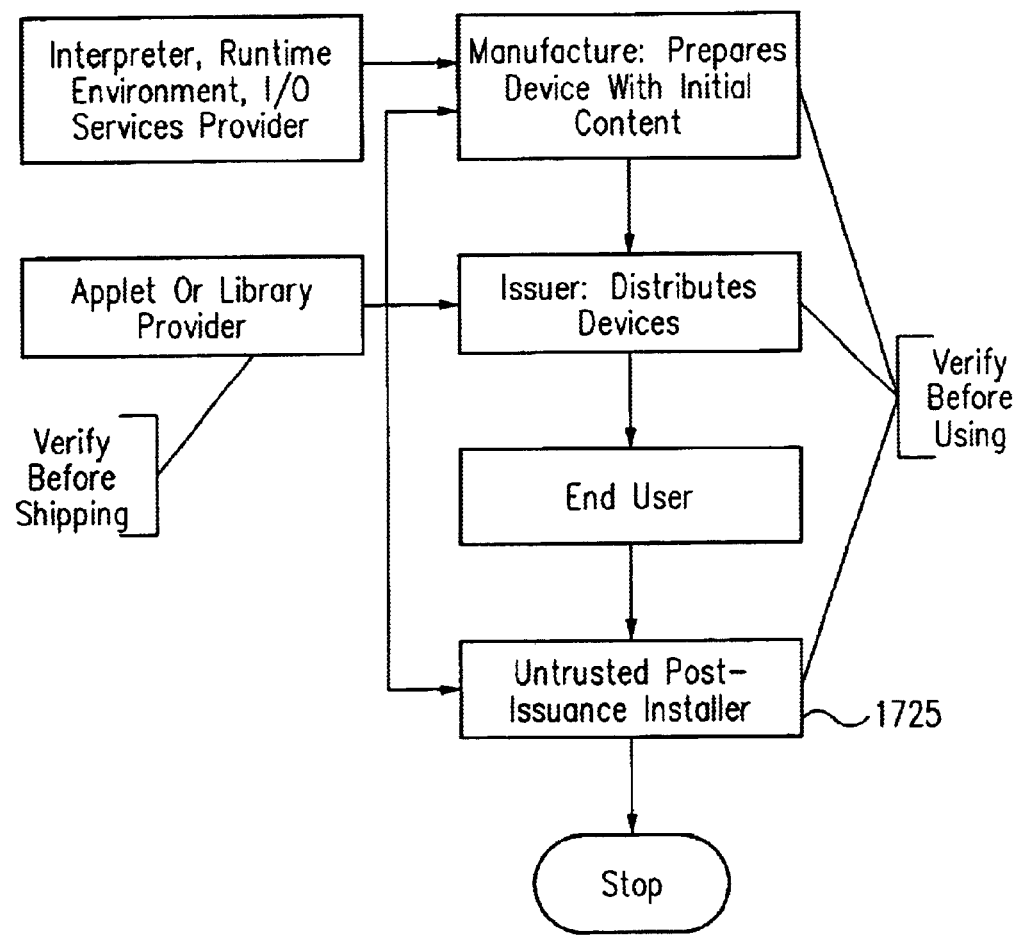
FIG. 21C is a block diagram that illustrates verification with untrusted post-issuance installation in accordance with one embodiment of the present invention.

According to another embodiment of the present invention, verification of program modules is performed in a system that allows post-issuance installations by an untrusted installer. Referring to FIG. 21C, note that FIG. 21C is the same as FIG. 21B, except that the post-issuance installer (1725) is untrusted. Preferably, the verifier in this case resides on a terminal device or another device not under the control of the untrusted installer (1725).

Figure 21D:
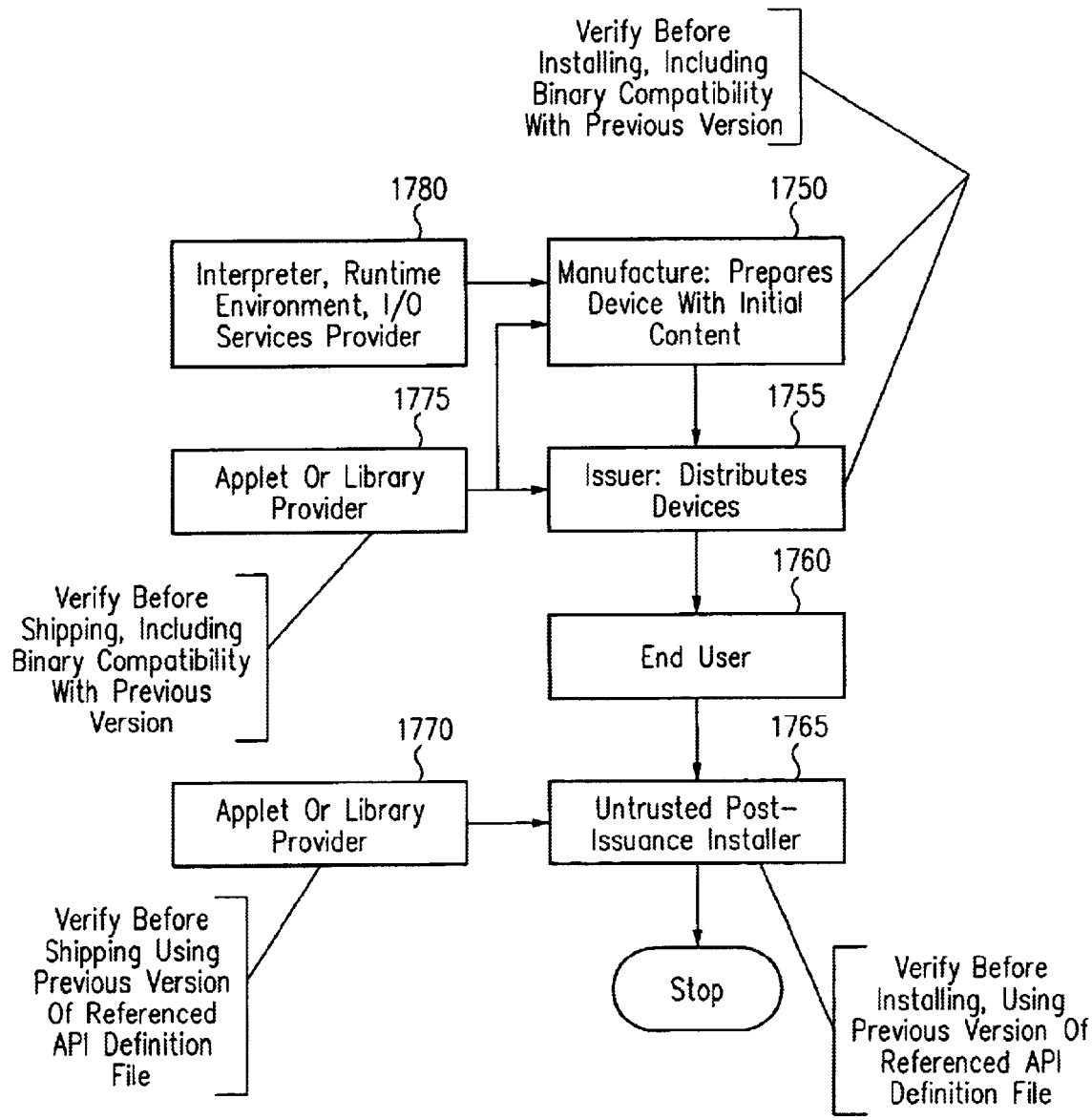
FIG. 21D is a block diagram that illustrates verification including binary compatibility with untrusted post-issuance installation in accordance with one embodiment of the present invention.

According to another embodiment of the present invention, verification of program modules is performed in a system that allows post-issuance installations by an untrusted installer. Furthermore, this embodiment performs binary compatibility checks as part of the verification. Referring to FIG. 21D, note that FIG. 21D is the same as FIG. 21C, except that each party that performs verification includes binary compatibility checks in the verification process. Those of ordinary skill in the art will recognize that verification that entails binary compatibility checks can also be applied to the scenarios shown in FIGS. 21A and 21B.

The above embodiments differ in the entities that are involved in the preparation of a card for an individual user. The above embodiments also differ regarding whether post-issuance installation is enabled. However, the details of verification process are equivalent, regardless of the entity performing the verification.

According to one embodiment of the present invention, the manufacturer, issuer and trusted post-issuance installer consider the applet or library to have been received from a potentially hostile environment. The verifier is run with the applet or library before installation. The manufacturer, issuer and trusted post-issuance installer make a determination regarding whether their environments are secure. If the environments are secure, the scenario depicted in either FIG. 11A (verifier on resource-rich device) or FIG. 11B (verifier on terminal) is used. If the environments are not secure, the scenario depicted in FIG. 11B (verifier on terminal) is used.

Preferably, the untrusted post-issuance installation operates in the scenario depicted in FIG. 11B (verifier on terminal).

In the scenario depicted by FIG. 11A (verifier on resource-rich device), the content provider preferably runs the verifier before shipping (using FIG. 11A), thus confirming that the binary file was not corrupted when it was prepared or stored in the applet/package provider's environment, and ensuring that the applet package provider is not shipping a hostile binary file to the manufacture, issuer, trusted post-issuance installer, or untrusted post-issuance installer.

According to one embodiment of the present invention, verification includes binary compatibility checks. Preferably, the manufacturer and issuer confirm that the updated resource-constrained device is binary compatible with the previous version(s). This prevents an older program unit from being placed into an invalid context when installed.

According to a preferred embodiment, programmatic content is installed in a secure environment. Once a verified binary file has been installed, the smart card's programmatic content is not altered by an unauthorized entity. Therefore, once a verified binary file is installed in this secure environment, the binary file's verification status is unchanged between subsequent executions. In other words, the binary file need not be re-verified before each execution.

Although the present invention has been illustrated with respect to a smart card implementation, the invention applies to other devices with a small footprint such as devices that are relatively restricted or limited in memory or in computing power or speed. Such resource-constrained devices may include boundary scan devices, field programmable devices, pagers and cellular phones among many others.

The present invention also relates to apparatus for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove more convenient to construct more specialized apparatus to perform the required process. The required structure for a variety of these machines will appear from the description given.

While the Java™ programming language and platform are suitable for the invention, any language or platform having certain characteristics would be well suited for implementing the invention. These characteristics include type safety, pointer safety, object-oriented, dynamically linked, and virtual machine based. Not all of these characteristics need to be present in a particular implementation. In some embodiments, languages or platforms lacking one or more of these characteristics may be utilized. Also, although the invention has been illustrated showing object-by-object security, other approaches, such as class-by-class security, could be utilized.

Additionally, while embodiments of the present invention have been illustrated using applets, those of ordinary skill in the art will recognize that the invention may be applied to stand-alone application programs.

The system of the present invention may be implemented in hardware or in a computer program. Each such computer program can be stored on a storage medium or device (e.g., CD-ROM, hard disk or magnetic diskette) that is readable by a general or special purpose programmable computer for configuring and operating the computer when the storage medium device is read by the computer to perform the procedures described. The system may also be implemented as a computer-readable storage medium, configured with a computer program, where the storage medium so configured causes a computer to operate in a specific and predefined manner.

The program is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Thus, a novel system and method for program verification using API definition files has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for remote incremental program verification, said method comprising:

receiving content verified by at least one content provider, said at least one content provider including an applet provider, a device manufacturer and a device issuer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

installing said content on a resource-constrained device;

disabling subsequent installation of content on said resource-constrained device; and issuing said resource-constrained device to an end user.

2. The method of claim 1 wherein said verification is performed by said applet provider.

3. The method of claim 1 wherein said verification is performed by said device manufacturer.

4. The method of claim 1 wherein said verification is performed by said device issuer.

5. The method of claim 1 wherein said verification is performed by said applet provider and said device manufacturer.

6. The method of claim 1 wherein said verification is performed by said applet provider and said device issuer.

7. The method of claim 1 wherein said verification is performed by said device manufacturer and said device issuer.

8. The method of claim 1 wherein said verification is performed by said applet provider, said device manufacturer and said device issuer.

9. A method for remote incremental program verification, said method comprising:

receiving content verified by at least one content provider, said at least one content provider including an applet provider, a device manufacturer, a device issuer and a trusted post-issuance installer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

installing said content on a resource-constrained device;

issuing said resource-constrained device to an end user; and allowing post-issuance installation of verified content on said resource-constrained device by said trusted post-issuance installer, said post-installation occurring after said issuance.

10. The method of claim 9 wherein said trusted post-issuance installer verifies a new program unit; and said trusted post-issuance installer installs said verified new program unit on said resource-constrained device.

11. The method of claim 10 wherein post-issuance verification is performed on a resource-rich device.

12. The method of claim 10 wherein post-issuance verification is performed on a terminal device.

13. The method of claim 9 wherein said verification is performed by the provider of said new program unit.

14. The method of claim 9 wherein said verification is performed by said applet provider.

15. The method of claim 9 wherein said verification is performed by said device manufacturer.

16. The method of claim 9 wherein said verification is performed by said device issuer.

17. The method of claim 9 wherein said verification is performed by said applet provider and said device manufacturer.

18. The method of claim 9 wherein said verification is performed by said applet provider and said device issuer.

19. The method of claim 9 wherein said verification is performed by said device manufacturer and said device issuer.

20. The method of claim 9 wherein said verification is performed by said applet provider, said device manufacturer and said device issuer.

21. The method of claim 9 wherein said verification is performed by said applet provider, said device manufacturer, said device issuer and said trusted post-issuance installer.

22. The method of claim 9 wherein said verification is performed by said device manufacturer, said device issuer and said trusted post-issuance installer.

23. The method of claim 9 wherein said verification is performed by said device manufacturer and said trusted post-issuance installer.

24. The method of claim 9 wherein said verification is performed by said device issuer and said trusted post-issuance installer.

25. The method of claim 9 wherein post-issuance verification is performed on a resource-rich device.

26. The method of claim 9 wherein post-issuance verification is performed on a terminal device.

27. A method for remote incremental program verification, said method comprising:

receiving content verified by at least one content provider, said at least one content provider including an applet provider, a device manufacturer, a device issuer and an untrusted post-issuance installer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

installing said content on a resource-constrained device;

issuing said resource-constrained device to an end user; and allowing post-issuance installation of verified content on said resource-constrained device by said untrusted post-issuance installer, said post-installation occurring after said issuance.

28. The method of claim 27 wherein said untrusted post-issuance installer verifies a new program unit; and said untrusted post-issuance installer installs said verified new program unit on said resource-constrained device.

29. The method of claim 28 wherein post-issuance verification is performed on a resource-rich device.

30. The method of claim 28 wherein post-issuance verification is performed on a terminal device.

31. The method of claim 28 wherein said verification is performed by the provider of said new program unit.

32. The method of claim 27 wherein said verification is performed by said applet provider.

33. The method of claim 27 wherein said verification is performed by said device manufacturer.

34. The method of claim 27 wherein said verification is performed by said device issuer.

35. The method of claim 27 wherein said verification is performed by said applet provider and said device manufacturer.

36. The method of claim 27 wherein said verification is performed by said applet provider and said device issuer.

37. The method of claim 27 wherein said verification is performed by said device manufacturer and said device issuer.

38. The method of claim 27 wherein said verification is performed by said applet provider, said device manufacturer and said device issuer.

39. The method of claim 27 wherein said verification is performed by said applet provider, said device manufacturer, said device issuer and said untrusted post-issuance installer.

40. The method of claim 27 wherein said verification is performed by said device manufacturer, said device issuer and said untrusted post-issuance installer.

41. The method of claim 27 wherein said verification is performed by said device manufacturer and said untrusted post-issuance installer.

42. The method of claim 27 wherein said verification is performed by said device issuer and said untrusted post-issuance installer.

43. The method of claim 27 wherein post-issuance verification is performed on a resource-rich device.

44. The method of claim 27 wherein post-issuance verification is performed on a terminal device.

45. A program storage device readable by a machine, embodying a program of instructions executable by the machine to perform program verification, comprising:
- receiving content verified by at least one content provider, said at least one content provider including an applet provider, a device manufacturer and a device issuer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;
- installing said content on a resource-constrained device;
- disabling subsequent installation of content on said resource-constrained device; and
- issuing said resource-constrained device to an end user.

46. A program storage device readable by a machine, embodying a program of instructions executable by the machine to perform program verification, comprising:
- receiving content verified by at least one content provider, said at least one content provider including an applet provider, a device manufacturer, a device issuer and a trusted post-issuance installer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;
- installing said content on a resource-constrained device;
- issuing said resource-constrained device to an end user, and
- allowing post-issuance installation of verified content on said resource-constrained device by said trusted post-issuance installer, said post-installation occurring after said issuance.

47. The program storage device of claim 46 wherein
- said trusted post-issuance installer verifies a new program unit; and
- said trusted post-issuance installer installs said verified new program unit on said resource-constrained device.

48. The program storage device of claim 47 wherein post-issuance verification is performed on a resource-rich device.

49. The program storage device of claim 47 wherein post-issuance verification is performed on a terminal device.

50. The program storage device of claim 46 wherein said verification is performed by the provider of said new program unit.

51. The program storage device of claim 46 wherein post-issuance verification is performed on a resource-rich device.

52. The program storage device of claim 46 wherein post-issuance verification is performed on a terminal device.

53. A program storage device readable by a machine, embodying a program of instructions executable by the machine to perform program verification, comprising:
- receiving content verified by at least one content provider, said at least one content provider including an applet provider, a device manufacturer, a device issuer and an untrusted post-issuance installer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;
- installing said content on a resource-constrained device;
- issuing said resource-constrained device to an end user; and
- allowing post-issuance installation of verified content on said resource-constrained device by said untrusted post-issuance installer, said post-installation occurring after said issuance.

54. The program storage device of claim 53 wherein
- said untrusted post-issuance installer verifies a new program unit; and
- said untrusted post-issuance installer installs said verified new program unit on said resource-constrained device.

55. The program storage device of claim 54 wherein post-issuance verification is performed on a resource-rich device.

56. The program storage device of claim 54 wherein post-issuance verification is performed on a terminal device.

57. The program storage device of claim 54 wherein said verification is performed by the provider of said new program unit.

58. A system for executing a software application, the system comprising:
- a computing system that generates executable code, comprising means for receiving content verified by at least one content provider, said at least one content provider including an applet provider, a device manufacturer and a device issuer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

means for installing said content on a resource-constrained device;

means for disabling subsequent installation of content on said resource-constrained device; and means for issuing said resource-constrained device to an end user.

59. A system for executing a software application, the system comprising:

a computing system that generates executable code, comprising means for receiving content verified by at least one content provider, said at least one content provider including an applet provider, a device manufacturer, a device issuer and a trusted post-issuance installer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

means for installing said content on a resource-constrained device;

means for issuing said resource-constrained device to an end user; and means for allowing post-issuance installation of verified content on said resource-constrained device by said trusted post-issuance installer, said post-installation occurring after said issuance.

60. The system of claim 59 wherein said trusted post-issuance installer includes a means for verifying a new program unit; and said trusted post-issuance installer includes a means for installing said verified new program unit on said resource-constrained device.

61. The system of claim 60 wherein post-issuance verification is performed on a resource-rich device.

62. The system of claim 60 wherein post-issuance verification is performed on a terminal device.

63. The system of claim 59 wherein said verification is performed by the provider of said new program unit.

64. A system for executing a software application, the system comprising:

a computing system that generates executable code, comprising means for receiving content verified by at least one content provider, said at least one content provider including an applet provider, a device manufacturer, a device issuer and an untrusted post-issuance installer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

means for installing said content on a resource-constrained device;

means for issuing said resource-constrained device to an end user; and means for allowing post-issuance installation of verified content on said resource-constrained device by said untrusted post-issuance installer, said post-installation occurring after said issuance.

65. The system of claim 64 wherein said untrusted post-issuance installer verifies a new program unit; and said untrusted post-issuance installer installs said verified new program unit on said resource-constrained device.

66. The system of claim 65 wherein post-issuance verification is performed on a resource-rich device.

67. The system of claim 65 wherein post-issuance verification is performed on a terminal device.

68. The system of claim 65 wherein said verification is performed by the provider of said new program unit.

69. A resource-constrained device, comprising:

memory for providing content verified by at least one content provider, said at least one content provider including an applet provider, a device manufacturer and a device issuer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data; and a virtual machine that is capable of executing instructions included within said application software program.

70. The resource-constrained device of claim 69 wherein said resource-constrained device comprises a smart card.

71. A resource-constrained device, comprising:

memory for providing content verified by at least one content provider, said at least one content provider including an applet provider, a device manufacturer, a device issuer and a trusted post-issuance installer, said content including at least one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

an installer device for installation of said content on said resource-constrained device, said installation including installation of initial content and installation of additional content by said trusted post-issuance installer after said resource-constrained device is issued to an end user; and a virtual machine that is capable of executing instructions included within said content.

72. The resource-constrained device of claim 71 wherein said resource-constrained device comprises a smart card.

73. A resource-constrained device, comprising:

memory for providing content verified by at least one content provider, said at least one content provider including an applet provider, a device manufacturer, a device issuer and an untrusted post-issuance installer, said content including at one program unit, each program unit comprising an Application Programming Interface (API) definition file and an implementation, each API definition file defining items in its associated program unit that are made accessible to one or more other program units, each implementation including executable code corresponding to said API definition file, said executable code including type specific instructions and data;

an installer device for installation of said content on said resource-constrained device, said installation including installation of initial content and installation of additional content by said untrusted post-issuance installer after said resource-constrained device is issued to an end user; and a virtual machine that is capable of executing instructions included within said content.

74. The resource-constrained device of claim 73 wherein said resource-constrained device comprises a smart card.

* * * * *